US012276338B2

United States Patent
Negishi et al.

(10) Patent No.: US 12,276,338 B2
(45) Date of Patent: Apr. 15, 2025

(54) SLIDING COMPONENT

(71) Applicant: EAGLE INDUSTRY CO., LTD., Tokyo (JP)

(72) Inventors: Yuta Negishi, Tokyo (JP); Ryosuke Uchiyama, Tokyo (JP); Hiroki Inoue, Tokyo (JP); Minori Onuma, Tokyo (JP); Yoshiaki Takigahira, Tokyo (JP); Hikaru Katori, Tokyo (JP); Nobuo Nakahara, Tokyo (JP); Takeshi Hosoe, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 110 days.

(21) Appl. No.: 17/928,580

(22) PCT Filed: May 31, 2021

(86) PCT No.: PCT/JP2021/020702
§ 371 (c)(1),
(2) Date: Nov. 29, 2022

(87) PCT Pub. No.: WO2021/246371
PCT Pub. Date: Dec. 9, 2021

(65) Prior Publication Data
US 2023/0235780 A1 Jul. 27, 2023

(30) Foreign Application Priority Data
Jun. 2, 2020 (JP) ................. 2020-095899

(51) Int. Cl.
*F16J 15/34* (2006.01)
(52) U.S. Cl.
CPC ......... *F16J 15/3424* (2013.01); *F16J 15/342* (2013.01)

(58) Field of Classification Search
CPC .... F16J 15/342; F16J 15/3412; F16J 15/3416; F16J 15/3424
See application file for complete search history.

(56) References Cited

U.S. PATENT DOCUMENTS

| 3,085,808 A | 4/1963 | Williams ....................... 277/388 |
| 3,232,680 A | 2/1966 | Clark ........................... 384/110 |

(Continued)

FOREIGN PATENT DOCUMENTS

| CN | 2534429 | 2/2003 | ............... F16J 15/40 |
| CN | 1492152 | 4/2004 | ............. F04D 29/12 |

(Continued)

OTHER PUBLICATIONS

Definition of groove by Merriam Webster.
(Continued)

*Primary Examiner* — Nicholas L Foster
(74) *Attorney, Agent, or Firm* — HAYES SOLOWAY P.C.

(57) ABSTRACT

An annular sliding component includes a sliding surface provided with a plurality of fluid introduction grooves communicating with a space on the side of a sealing target fluid and introducing the sealing target fluid thereinto and a plurality of inclined grooves extending from a leakage side toward the sealing target fluid and generating a dynamic pressure and the sliding surface of the sliding component is provided with a reverse inclined groove which is provided on the side of the sealing target fluid of the inclined groove, extends in a reverse direction with respect to the inclined groove, and generates a dynamic pressure.

7 Claims, 19 Drawing Sheets

(56) References Cited

U.S. PATENT DOCUMENTS

| | | | |
|---|---|---|---|
| 3,466,052 A | 4/1966 | Ludwig | |
| 3,376,083 A * | 4/1968 | Muijderman | F16C 33/102 384/123 |
| 3,410,565 A | 11/1968 | Williams | 277/348 |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,804,424 A | 4/1974 | Gardner | 277/27 |
| 4,406,466 A | 9/1983 | Geary, Jr. | 277/347 |
| 4,486,026 A | 12/1984 | Furumura et al. | 277/80 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,441,283 A | 8/1995 | Pecht et al. | 277/96.1 |
| 5,447,316 A | 9/1995 | Matsui | F16J 15/34 |
| 5,492,341 A | 2/1996 | Pecht | 277/400 |
| 5,498,007 A | 3/1996 | Kulkarni | 277/366 |
| 5,501,470 A | 3/1996 | Fuse | 277/400 |
| 5,556,111 A | 9/1996 | Sedy | 277/96.1 |
| 5,664,787 A | 9/1997 | Fuse et al. | F16J 15/34 |
| 5,702,110 A | 12/1997 | Sedy | |
| 5,895,051 A | 4/1999 | Bowers | B62D 5/22 |
| 6,152,452 A | 11/2000 | Wang | F16J 15/38 |
| 6,189,896 B1 | 2/2001 | Dickey et al. | F16L 17/06 |
| 6,446,976 B1 | 9/2002 | Key | 277/367 |
| 6,817,766 B2 | 11/2004 | Gomyo | F16C 32/06 |
| 7,044,470 B2 * | 5/2006 | Zheng | F16J 15/3448 277/408 |
| 7,258,346 B2 * | 8/2007 | Tejima | F16J 15/3412 277/400 |
| 7,510,330 B2 | 3/2009 | Obara | F16C 32/06 |
| 7,568,839 B2 | 8/2009 | Gotoh et al. | F16C 32/06 |
| 7,758,051 B2 | 7/2010 | Roberts-Haritonov et al. | F16J 15/34 |
| 8,814,433 B2 * | 8/2014 | Tokunaga | F16C 33/741 384/123 |
| 9,062,775 B2 | 6/2015 | Short et al. | F16J 15/34 |
| 9,279,455 B2 * | 3/2016 | Tokunaga | F01D 25/168 |
| 9,291,200 B2 * | 3/2016 | Tokunaga | F16C 33/74 |
| 9,353,865 B2 * | 5/2016 | Lattin | F16J 15/342 |
| 9,371,912 B2 | 6/2016 | Hosoe et al. | F16J 15/34 |
| 9,470,267 B2 * | 10/2016 | Tokunaga | F16J 15/342 |
| 9,587,745 B2 | 3/2017 | Itadani et al. | F16J 15/3412 |
| 9,611,938 B1 | 4/2017 | Itadani et al. | F16J 15/34 |
| 9,677,670 B2 | 6/2017 | Itadani et al. | F16J 15/34 |
| 9,765,892 B2 | 9/2017 | Itadani et al. | F16J 15/34 |
| 9,829,109 B2 | 11/2017 | Itadani et al. | F16J 15/3412 |
| 9,845,886 B2 * | 12/2017 | Itadani | F16C 33/72 |
| 9,850,953 B2 * | 12/2017 | Tokunaga | F01D 25/186 |
| 9,951,873 B2 | 4/2018 | Inoue et al. | F16J 15/34 |
| 9,982,784 B2 | 5/2018 | Osada et al. | F16J 15/34 |
| 10,072,759 B2 | 9/2018 | Inoue et al. | F16J 15/34 |
| 10,113,648 B2 | 10/2018 | Inoue et al. | F16J 15/342 |
| 10,337,620 B2 | 7/2019 | Tokunaga et al. | F16J 15/342 |
| 10,473,220 B2 | 11/2019 | Tokunaga et al. | F16J 15/34 |
| 10,487,948 B2 | 11/2019 | Inoue et al. | F16J 15/34 |
| 10,495,228 B2 | 12/2019 | Itadani et al. | F16J 15/34 |
| 10,626,995 B2 | 4/2020 | Itadani | F16J 15/34 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 11,009,072 B2 | 5/2021 | Kimura et al. | F16J 15/34 |
| 11,009,130 B2 * | 5/2021 | Itadani | F16J 15/34 |
| 11,125,335 B2 | 9/2021 | Kimura et al. | F16J 15/34 |
| 11,739,844 B2 * | 8/2023 | Katori | F16J 15/34 277/361 |
| 11,821,521 B2 * | 11/2023 | Imura | F16J 15/342 |
| 11,933,303 B2 * | 3/2024 | Suzuki | F16J 15/3412 |
| 12,018,757 B2 * | 6/2024 | Suzuki | F16C 33/107 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0141789 A1 | 6/2005 | Kita et al. | F16C 32/06 |
| 2005/0212217 A1 | 9/2005 | Tejima | 277/399 |
| 2007/0296156 A1 | 12/2007 | Yanagisawa et al. | F16J 15/34 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2012/0018957 A1 | 1/2012 | Watanabe | 277/387 |
| 2013/0189294 A1 | 7/2013 | Koelle et al. | F16J 15/34 |
| 2013/0209011 A1 | 8/2013 | Tokunaga | F16C 32/0633 |
| 2015/0115537 A1 | 4/2015 | Tokunaga | F16J 15/34 |
| 2015/0123350 A1 | 5/2015 | Itadani | 277/400 |
| 2015/0184752 A1 | 7/2015 | Itadani | F16J 15/3412 |
| 2015/0226334 A1 | 8/2015 | Itadani | F16J 15/342 |
| 2015/0240950 A1 | 8/2015 | Takahashi | F16J 15/363 |
| 2015/0260292 A1 | 9/2015 | Inoue et al. | F16J 15/342 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/34 |
| 2016/0252182 A1 | 9/2016 | Itadani et al. | F16J 15/34 |
| 2017/0198814 A1 | 7/2017 | Colombo et al. | F16J 15/3412 |
| 2017/0234431 A1 | 8/2017 | Katori et al. | F16J 15/3412 |
| 2017/0350407 A1 | 12/2017 | Yamamoto | F16C 33/1045 |
| 2018/0073394 A1 | 3/2018 | Tokunaga et al. | F01D 25/183 |
| 2018/0128377 A1 | 5/2018 | Tokunaga et al. | F16J 15/342 |
| 2018/0128378 A1 | 5/2018 | Tokunaga et al. | F16J 15/342 |
| 2018/0172162 A1 * | 6/2018 | Tokunaga | F16C 33/107 |
| 2019/0178386 A1 | 6/2019 | Arai | F16J 15/3496 |
| 2019/0301522 A1 | 10/2019 | Negishi et al. | F16C 17/026 |
| 2019/0316682 A1 | 10/2019 | Negishi et al. | F16J 15/34 |
| 2020/0182299 A1 | 6/2020 | Kimura et al. | F16C 33/10 |
| 2020/0224768 A1 | 7/2020 | Imura et al. | F16J 15/34 |
| 2021/0048062 A1 | 2/2021 | Masumi | F16J 15/3412 |
| 2021/0355992 A1 | 11/2021 | Tokunaga | F16C 17/10 |
| 2022/0120313 A1 | 4/2022 | Ou | F16C 17/024 |
| 2023/0228292 A1 * | 7/2023 | Negishi | F16C 17/028 384/292 |
| 2024/0209891 A1 * | 6/2024 | Uchida | F16J 15/3412 |

FOREIGN PATENT DOCUMENTS

| | | | |
|---|---|---|---|
| CN | 101749431 | 6/2010 | F16J 15/34 |
| CN | 101776152 | 7/2010 | F16J 15/48 |
| CN | 103267132 | 8/2013 | F16J 15/54 |
| CN | 103732958 | 4/2014 | F16J 15/34 |
| CN | 103791097 | 5/2014 | F16J 15/34 |
| CN | 104019237 | 9/2014 | F16J 15/16 |
| CN | 104165229 | 11/2014 | F16J 15/40 |
| CN | 104919229 | 9/2015 | F16J 15/34 |
| CN | 105683632 | 6/2016 | F16J 15/34 |
| CN | 106439037 | 2/2017 | F16J 15/34 |
| CN | 206017723 | 3/2017 | F16J 15/16 |
| CN | 107166036 | 9/2017 | F16J 15/16 |
| CN | 107532724 | 1/2018 | F16J 15/34 |
| CN | 108506494 | 9/2018 | F16J 15/34 |
| DE | 3619489 | 12/1987 | F16J 15/34 |
| DE | 4407453 | 9/1995 | F16C 17/08 |
| EP | 0637706 | 8/1993 | F16J 15/34 |
| EP | 0896163 | 2/1999 | F16C 33/10 |
| EP | 2520835 | 11/2012 | F16J 15/34 |
| EP | 2626604 | 8/2013 | F16J 15/34 |
| EP | 2977655 | 1/2016 | F16J 15/34 |
| EP | 3091258 | 11/2016 | F16J 15/34 |
| EP | 3299686 | 3/2018 | F16J 15/34 |
| EP | 3922872 | 12/2021 | F16J 15/34 |
| EP | 3926187 | 12/2021 | F16C 17/04 |
| EP | 3926188 | 12/2021 | F16C 17/04 |
| EP | 3943765 | 1/2022 | F16C 17/04 |
| HK | 2006-022834 | 1/2006 | F16J 15/34 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | S57-146955 | 9/1982 | F16J 15/34 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | S60-107461 | 7/1985 | B63H 23/36 |
| JP | S6182177 | 5/1986 | F16J 15/34 |
| JP | S62-37572 | 2/1987 | F16J 51/34 |

(56) References Cited

FOREIGN PATENT DOCUMENTS

| | | | | |
|---|---|---|---|---|
| JP | S63-033027 | 3/1988 | ............... | F16C 33/46 |
| JP | S63-190975 | 8/1989 | ............... | F16J 15/34 |
| JP | H01133572 | 9/1989 | ............... | F16J 15/34 |
| JP | 2-236067 | 9/1990 | ............... | F16J 15/34 |
| JP | 3-14371 | 2/1991 | ............... | F16J 15/34 |
| JP | 3-35372 | 4/1991 | ............... | F16J 15/34 |
| JP | 3-41267 | 4/1991 | ............... | F16J 15/34 |
| JP | 3-41268 | 4/1991 | ............... | F16J 15/34 |
| JP | 3-108972 | 11/1991 | ............... | F16J 15/34 |
| JP | H04-73 | 1/1992 | ............... | F16J 15/34 |
| JP | H04-145267 | 5/1992 | ............... | F16J 15/34 |
| JP | H04-96671 | 8/1992 | ............... | F16J 15/34 |
| JP | H05-90048 | 12/1993 | ............... | F16J 15/34 |
| JP | H05-322050 | 12/1993 | ............... | F16J 15/34 |
| JP | 6-66374 | 3/1994 | ............... | F16J 15/34 |
| JP | H07-55016 | 3/1995 | ............... | F16J 15/34 |
| JP | H08-89489 | 4/1996 | ............... | A61B 5/05 |
| JP | H09-503276 | 3/1997 | ............... | F16J 15/34 |
| JP | H09-329247 | 12/1997 | ............... | F16J 15/34 |
| JP | H10-38093 | 2/1998 | ............... | F16J 15/34 |
| JP | H10-281299 | 10/1998 | ............... | F16J 15/34 |
| JP | 2000-179543 | 6/2000 | ............... | F16C 17/10 |
| JP | 2001-295833 | 10/2001 | ............... | F16C 17/04 |
| JP | 2001-317638 | 11/2001 | ............... | F16J 15/34 |
| JP | 2003-161322 | 6/2003 | ............... | F16C 33/10 |
| JP | 2003-343741 | 12/2003 | ............... | F16J 15/34 |
| JP | 2004-003578 | 1/2004 | ............... | F16J 15/34 |
| JP | 2005-180652 | 7/2005 | ............... | F16J 15/34 |
| JP | 2005-188651 | 7/2005 | ............... | F16J 15/34 |
| JP | 2005-58051 | 12/2005 | ............... | F16C 33/74 |
| JP | 2006-9828 | 1/2006 | ............... | F16C 17/02 |
| JP | 2006-77899 | 3/2006 | ............... | F16J 15/34 |
| JP | 2008/144864 | 6/2008 | ............... | F16C 33/10 |
| JP | 2009-250378 | 10/2009 | ............... | F16J 15/34 |
| JP | 2010-133496 | 6/2010 | ............... | F16J 15/34 |
| JP | 2010-216587 | 9/2010 | ............... | F16J 15/34 |
| JP | 2011-185292 | 9/2011 | ............... | F16J 15/34 |
| JP | 2012-2295 | 1/2012 | ............... | F16J 15/34 |
| JP | 5271858 | 5/2013 | ............... | F16J 15/34 |
| JP | 2016-80090 | 5/2016 | ............... | F16J 15/34 |
| JP | 2017-141961 | 8/2017 | ............... | F16J 15/34 |
| JP | 6444492 | 12/2018 | ............... | F16J 15/34 |
| JP | 2019/15401 | 1/2019 | ............... | F16J 15/34 |
| JP | 2019-173953 | 10/2019 | ............... | F16J 15/34 |
| JP | 2020173020 | 10/2020 | ............... | F16C 33/74 |
| WO | WO9506212 | 3/1995 | ............... | F16J 15/34 |
| WO | WO9506832 | 3/1995 | ............... | F16J 15/34 |
| WO | WO2012046749 | 4/2012 | ............... | F16J 15/34 |
| WO | WO2014024742 | 2/2014 | ............... | F16J 15/34 |
| WO | WO2014050920 | 4/2014 | ............... | F16J 15/34 |
| WO | WO2014103630 | 7/2014 | ............... | F16J 15/34 |
| WO | WO2014112455 | 7/2014 | ............... | F16J 15/34 |
| WO | WO2014148316 | 9/2014 | ............... | F16J 15/34 |
| WO | WO2014174725 | 10/2014 | ............... | F16J 15/34 |
| WO | WO2015199171 | 12/2015 | ............... | F16J 15/34 |
| WO | WO2016009408 | 1/2016 | ............... | F16J 15/34 |
| WO | WO2016035860 | 3/2016 | ............... | F16J 15/34 |
| WO | WO2016167262 | 10/2016 | ............... | F16J 15/34 |
| WO | WO2016186019 | 11/2016 | ............... | F16J 15/34 |
| WO | WO2016203878 | 12/2016 | ............... | F16J 15/34 |
| WO | WO2017002774 | 1/2017 | ............... | F16J 15/34 |
| WO | WO2017061406 | 4/2017 | ............... | F16J 15/34 |
| WO | WO2018034197 | 2/2018 | ............... | F16J 15/34 |
| WO | WO2018088353 | 5/2018 | ............... | F16J 15/34 |
| WO | WO2018105505 | 6/2018 | ............... | F16J 15/34 |
| WO | WO2018139231 | 8/2018 | ............... | F16J 15/34 |
| WO | WO2018139232 | 8/2018 | ............... | F16C 33/10 |
| WO | WO2019044671 | 3/2019 | ............... | F16C 17/04 |
| WO | WO2019069887 | 4/2019 | ............... | F16J 15/34 |
| WO | WO2020162025 | 12/2019 | ............... | F16C 17/04 |
| WO | WO2020032086 | 2/2020 | ............... | F16J 15/34 |
| WO | WO2020085122 | 4/2020 | ............... | F16J 15/34 |

OTHER PUBLICATIONS

International Search Report and Written Opinion and International Preliminary Report on Patentability issued in PCT/JP2021/020703, dated Jul. 27, 2021, 25 pages.
International Search Report and Written Opinion and International Preliminary Report on Patentability issued in PCT/JP2021/020702, dated Aug. 10, 2021, 32 pages.
International Search Report and Written Opinion and International Preliminary Report on Patentability issued in PCT/JP2022/013241, dated Jun. 7, 2022, 26 pages.
European Search Report issued in related application serial No. 21818322.6, dated May 24, 2024, 8 pages.
European Search Report issued in related application serial No. 21818954.8, dated May 31, 2024, 8 pages.
European Search Report issued in related application serial No. 21818954.6, dated May 31, 2024, 8 pages.
Official Action issued in related U.S. Appl. No. 17/928,571, dated Jul. 1, 2024, 7 pages.
Korean Official Action issued in related application serial No. 10-2022-7043001, dated Aug. 26, 2024, with English translation, 17 pages.
Korean Official Action issued in related application serial No. 10-2022-7043002, dated Aug. 26, 2024, with English translation, 13 pages.
Notice of Allowance issued in related U.S. Appl. No. 17/928,571, dated Sep. 18, 2024, 4 pages.

* cited by examiner

SLIDING COMPONENT

TECHNICAL FIELD

The present invention relates to sliding components that rotate relative to each other and are used for, for example, a shaft sealing device shaft-sealing a rotary shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents a leakage of a sealing target fluid, for example, a mechanical seal includes a pair of annular sliding components rotating relative to each other so that sliding surfaces slide on each other. In such a mechanical seal, there has been a recent demand to reduce the energy lost caused by sliding for environmental measures and the like.

For example, in a mechanical seal shown in Patent Citation 1, a pair of annular sliding components is rotatable relative to each other, a sealing target fluid exists in an outer space, and a low-pressure fluid exists in an inner space. One sliding component is provided with a fluid introduction groove which communicates with the outer space having the sealing target fluid existing therein and has a closed inner radial end and an inclined groove which communicates with the inner space having the low-pressure fluid existing therein, extends in an arc shape while being inclined in a circumferential direction from an inner radial end toward the outer radial side, and has an outer radial end closed on a downstream side of a relative rotation direction. Accordingly, when the relative rotation of the pair of sliding components starts, the sealing target fluid existing in the outer space is introduced into the fluid introduction groove to lubricate the sliding surfaces of the pair of sliding components. When the pair of sliding components rotates at a high speed, the low-pressure fluid existing in the inner space is introduced into the inclined groove and a positive pressure is generated at the outer radial end and in the vicinity thereof to slightly separate the sliding surfaces of the pair of sliding components from each other. Accordingly, low friction is realized. Further, since the sealing target fluid flowing between the sliding surfaces from the outer space and directed toward the inner radial side of the sliding surface is sucked by the inclined groove during a high-speed rotation, it is possible to prevent the sealing target fluid from leaking to the low-pressure inner space from between the pair of sliding components.

CITATION LIST

Patent Literature

Patent Citation 1: JP 6444492 B2 (Pages 9 and 10, FIG. 2)

SUMMARY OF INVENTION

Technical Problem

However, in the sliding component described in Patent Citation 1, since the inclined groove is disposed on the leakage side of one sliding component and extends from the inner radial end toward the outer radial side to introduce the leakage side fluid in the normal rotation state, it is possible to reduce the friction and suppress the leakage. On the other hand, since the sealing target fluid flows out between the sliding surfaces from the fluid introduction groove in the reverse rotation state, it is possible to obtain the excellent lubricity. However, the sealing target fluid has a problem that the sealing target fluid leaks into the inner space from between the pair of sliding components.

The present invention has been made in view of such problems and an object thereof is to provide a sliding component capable of suppressing a wear between sliding surfaces and suppressing a leakage of a sealing target fluid in any one of a normal rotation and a reverse rotation (hereinafter, referred to as both rotations).

Solution to Problem

In order to solve the above-described problems, a sliding component according to the present invention is a sliding component formed in a annular shape and disposed at a relatively rotating position of a rotating machine, sliding relative to a different component, and includes a sliding surface provided with a plurality of fluid introduction grooves communicating with a space on a sealing target fluid side and introducing a sealing target fluid thereinto and a plurality of inclined grooves extending from a leakage side toward the sealing target fluid side and generating a dynamic pressure, wherein the sliding surface of the sliding component is provided with a reverse inclined groove which is provided on the sealing target fluid side of the inclined groove, extends in a reverse direction with respect to the inclined groove, and generates a dynamic pressure. According to the aforesaid feature of the present invention, since the sealing target fluid having entered the reverse inclined groove on the sealing target fluid side in relation to the inclined groove moves in a following manner due to shearing with the sliding surface of the other sliding component and is returned between the sliding surfaces from the end portion on the sealing target fluid side of the reverse inclined groove toward the sealing target fluid side in the reverse rotation state, it is possible to reduce the leakage of the sealing target fluid to the leakage side space. Further, it is possible to suppress the wear by lubricating the sliding surfaces during both rotations and to suppress the sealing target fluid from leaking to the leakage side space from between the pair of sliding components.

It may be preferable that each of the inclined grooves communicates with a space of the leakage side. According to this preferable configuration, since the leakage side fluid is easily introduced into the inclined groove and the positive pressure is easily generated due to the leakage side fluid in the inclined groove in the normal rotation state, it is possible to increase the dynamic pressure effect.

It may be preferable that one of the inclined grooves and the reverse inclined groove form one continuous groove. According to this preferable configuration, since the sealing target fluid tending to move toward the leakage side through the inclined groove can be returned toward the sealing target fluid side by the reverse inclined groove in the reverse rotation state, it is possible to reduce the leakage of the sealing target fluid to the leakage side space.

It may be preferable configuration that a annular land portion which is continuous in the circumferential direction on the sealing target fluid side of the inclined grooves and has a predetermined radial width or more is provided between the inclined grooves and the reverse inclined groove. According to this preferable configuration, since the sealing target fluid is captured in the reverse inclined groove on the sealing target fluid side of the annular land portion in the reverse rotation state, it is possible to suppress the sealing target fluid from entering the inclined groove. Further, since the inclined groove and the reverse inclined groove are separated from each other by the annular land portion and the inclined groove and the reverse inclined groove do not interfere with each other in the generation of the dynamic pressure during both rotations, it is easy to exhibit the dynamic pressure effect.

It may be preferable that a radial center of the annular land portion is disposed closer to the sealing target fluid side in relation to a radial center of the sliding surface. According to this preferable configuration, since the annular land portion is disposed on the sealing target fluid side of the sliding surface in the radial direction, it is possible to ensure the long extension length of the inclined groove. Further, since the inclined groove is mainly used to generate the dynamic pressure in relation to the reverse inclined groove in the normal rotation state, it is possible to suppress the sealing target fluid from leaking to the leakage side space.

It may be preferable that the reverse inclined groove has an extension length shorter than extension lengths of the inclined grooves. According to this preferable configuration, it is possible to generate the positive pressure in the reverse inclined groove at an early time in the reverse rotation state.

It may be preferable that the reverse inclined groove is a groove of which an end portion on the sealing target fluid side is tapered. According to this preferable configuration, since it is possible to easily generate the positive pressure by allowing the sealing target fluid to concentrate on the tapered end portion of the reverse inclined groove in the reverse rotation state, it is possible to increase the dynamic pressure effect.

It may be preferable that each of the fluid introduction grooves includes a dynamic pressure generation portion. According to this preferable configuration, since it is possible to generate the dynamic pressure by the dynamic pressure generation portion so that the sliding surfaces are slightly separated from each other and the sealing target fluid is introduced between the sliding surfaces, it is possible to improve the lubricity between the sliding surfaces.

In addition, in the sliding surface of the sliding component according to the present invention, the inclined groove may be formed such that the extension direction of the inclined groove includes both a radial component and a circumferential component. Similarly, the reverse inclined groove may be formed such that the extension direction of the reverse inclined groove includes both a radial component and a circumferential component and the direction of the circumferential direction extending from the upstream toward the downstream during the relative rotation may be opposite to that of the inclined groove.

In addition, the sealing target fluid may be a gas or a liquid or may be a mist in which a liquid and a gas are mixed.

DESCRIPTION OF EMBODIMENTS

Figure 1:
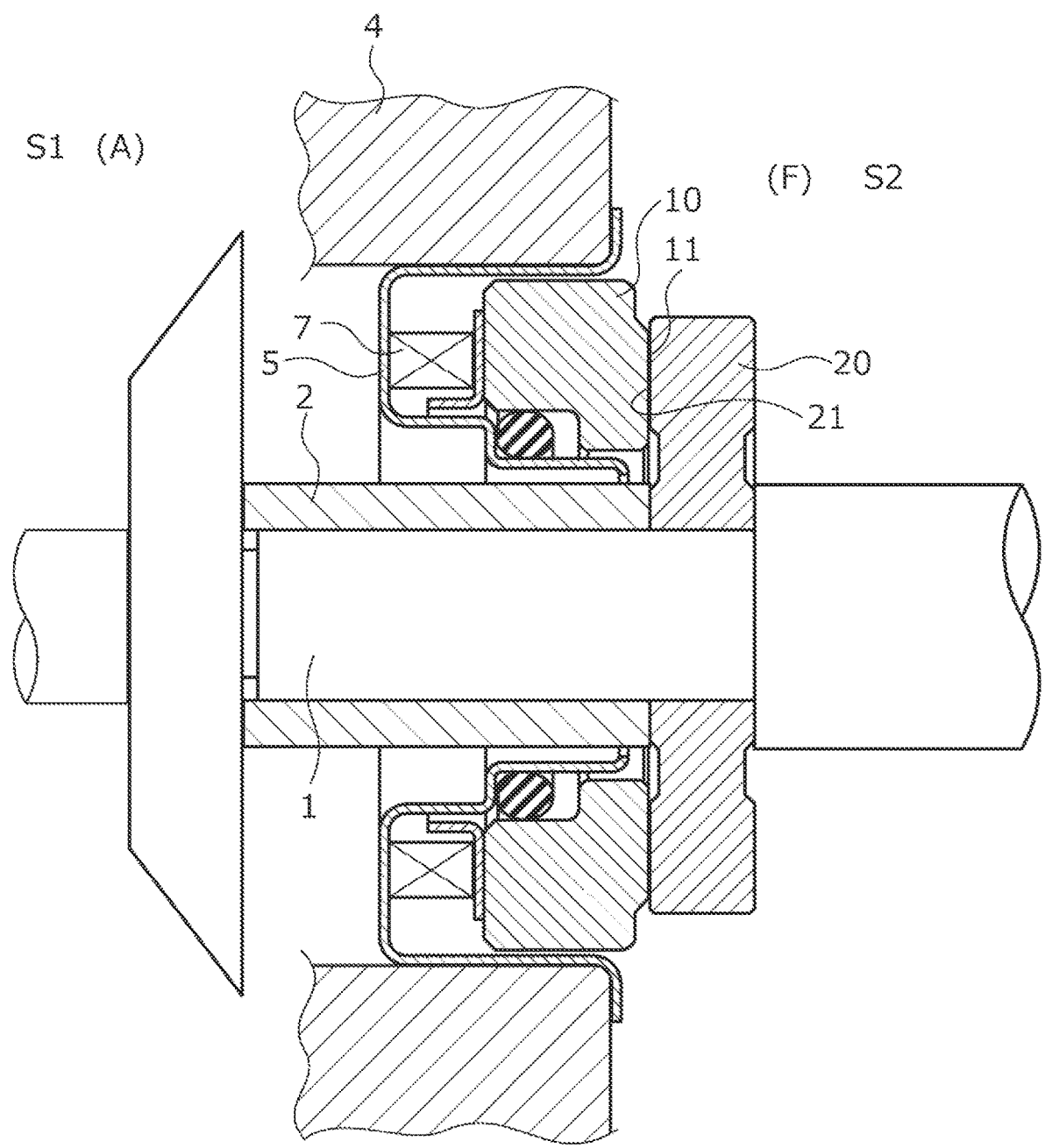
FIG. 1 is a longitudinal sectional view showing an example of a mechanical seal including a sliding component according to a first embodiment of the present invention.

Modes for carrying out a sliding component according to the present invention will be described below on the basis of the embodiments.

First Embodiment

A sliding component according to a first embodiment of the present invention will be described with reference to FIGS. 1 to 5. Additionally, in this embodiment, an embodiment in which a sliding component is a mechanical seal will be described as an example. Further, a description will be made such that a sealing target fluid exists in an outer space of the mechanical seal, an atmosphere exists in an inner space, an outer radial side of the sliding component constituting the mechanical seal is a sealing target fluid side (high pressure side), and an inner radial side is a leakage side (low pressure side). Further, for convenience of description, in the drawings, dots may be added to a groove and the like formed on a sliding surface.

A mechanical seal for automobiles shown in FIG. 1 is of an inside type that seals a sealing target fluid F tending to leak from the outer radial side toward the inner radial side of the sliding surface and allows an inner space S1 to communicate with an atmosphere A. Additionally, in this embodiment, an embodiment in which the sealing target fluid F is a high-pressure liquid and the atmosphere A is a gas having a pressure lower than that of the sealing target fluid F is illustrated.

The mechanical seal mainly includes a rotating seal ring 20 which is the other annular sliding component provided in a rotary shaft 1 through a sleeve 2 to be rotatable together with the rotary shaft 1 and an annular stationary seal ring 10 which is a sliding component provided in a seal cover 5 fixed to a housing 4 of an attachment target device not to be rotatable and to be movable in the axial direction and when an elastic member 7 urges the stationary seal ring 10 in the axial direction, a sliding surface 11 of the stationary seal ring 10 and a sliding surface 21 of the rotating seal ring 20 slide closely with each other. Additionally, the sliding surface 21 of the rotating seal ring 20 is formed as a flat surface and this flat surface is not provided with a concave portion such as a groove.

The stationary seal ring 10 and the rotating seal ring 20 are typically formed of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
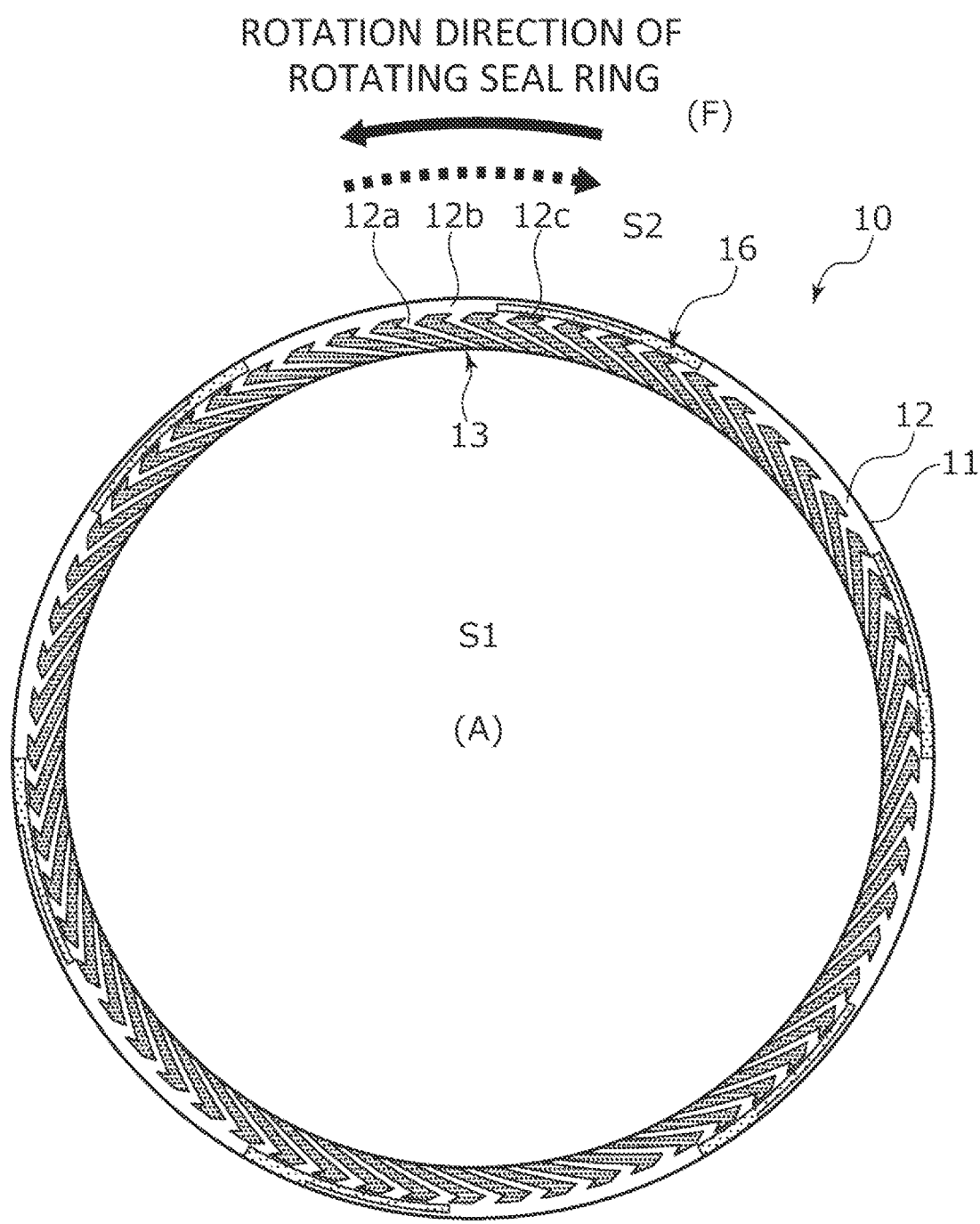
FIG. 2 is a view of a sliding surface of a stationary seal ring of the first embodiment as viewed from the axial direction.
Figure 3:
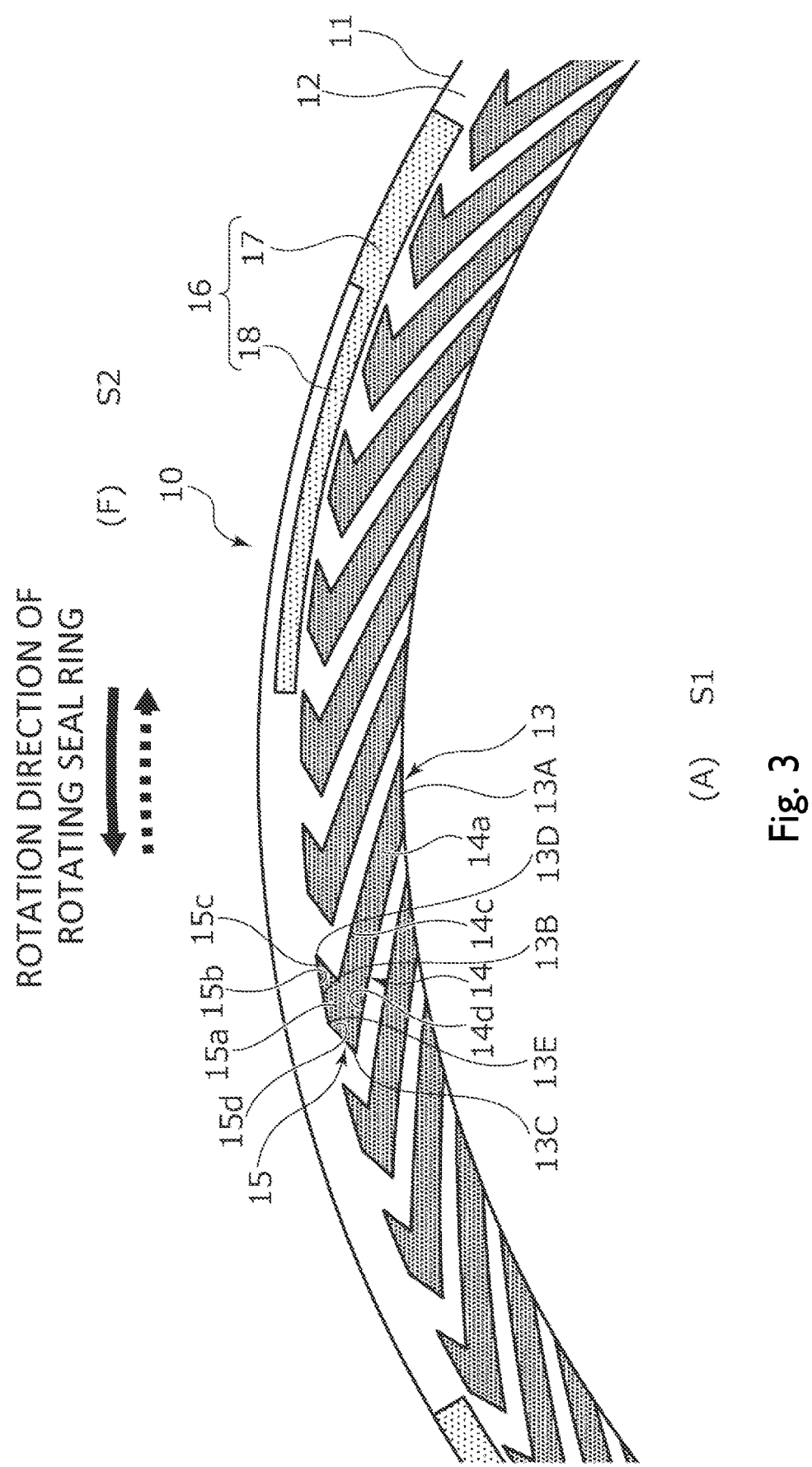
FIG. 3 is an enlarged view of the sliding surface of the stationary seal ring of the first embodiment as viewed from the axial direction.

As shown in FIGS. 2 and 3, the rotating seal ring 20 slides relative to the stationary seal ring 10 counterclockwise as indicated by the solid arrow or clockwise as indicated by the dotted arrow, a plurality of dynamic pressure generation grooves 13 are evenly arranged in the circumferential direction on the inner radial side of the sliding surface 11 of the stationary seal ring 10, and a plurality of fluid introduction grooves 16 are evenly arranged in the circumferential direction on the outer radial side.

Hereinafter, in the embodiments, the counterclockwise rotation direction of the rotating seal ring 20 indicated by the solid arrow will be described as the normal rotation direction and the clockwise rotation direction of the rotating seal ring 20 indicated by the dotted arrow will be described as the reverse rotation direction.

Further, a portion other than the dynamic pressure generation groove 13 and the fluid introduction groove 16 of the sliding surface 11 is formed as a land 12 forming a flat surface. Specifically, the land 12 includes a land portion 12a which is formed between the dynamic pressure generation grooves 13 adjacent to each other in the circumferential direction, a land portion 12b which is formed between the fluid introduction grooves 16 adjacent to each other in the circumferential direction, and a land portion 12c which is formed between the dynamic pressure generation groove 13 and the fluid introduction groove 16 separated from each other in the radial direction and these land portions are arranged on the same plane and constitute the flat surface of the land 12.

As shown in FIG. 3, the dynamic pressure generation groove 13 includes an inclined groove 14 which extends from the inner radial side toward the outer radial side and generates a dynamic pressure and a reverse inclined groove 15 which is continuously formed on the outer radial side of the inclined groove 14, extends in the reverse direction with respect to the inclined groove 14, and generates a dynamic pressure and is formed in an L shape. Further, extending in the reverse direction with respect to the inclined groove 14 means that the reverse inclined groove 15 obliquely extends while having a component in the reverse rotation direction from the inner radial side toward the outer radial side with respect to the inclined groove 14 obliquely extending while having a component in the normal rotation direction from the inner radial side toward the outer radial side.

Specifically, the dynamic pressure generation groove 13 extends in an arc shape while being inclined in the normal rotation direction of the rotating seal ring 20 from an inner radial end 13A toward the outer radial side by allowing the inner radial end 13A, that is, the inner radial end of the inclined groove 14 to communicate with the inner space S1 and the reverse inclined groove 15 is continuously formed on the outer radial end portion of the inclined groove 14 to extend in the reverse direction with respect to the inclined groove 14. The reverse inclined groove 15 extends in a linear shape while being inclined in the reverse rotation direction of the rotating seal ring 20 from the inner radial end portion toward the outer radial side and is closed so that the outer radial end portion, that is, the outer radial end 13B of the dynamic pressure generation groove 13 does not communicate with an outer space S2. In addition, the reverse inclined groove 15 is not limited to the one obliquely extending in a linear shape and may be one extending in an arc shape.

As shown in FIG. 3, the inclined groove 14 includes a bottom surface 14a which is flat in the extension direction and is parallel to the flat surface of the land 12 and side wall portions 14c and 14d which perpendicularly extend from both side edges of the bottom surface 14a toward the flat surface of the land 12.

The reverse inclined groove 15 includes a bottom surface 15a which is flat in the extension direction and is parallel to the flat surface of the land 12, a wall portion 15b which extends perpendicularly from the end edge on the side of the outer radial end 13B in the bottom surface 15a toward the flat surface of the land 12, and side wall portions 15c and 15d which extend perpendicularly from both side edges of the bottom surface 15a toward the flat surface of the land 12.

Further, the dynamic pressure generation groove 13 is provided with an acute angle portion 13C which is formed by the side wall portion 14d of the inclined groove 14 and the side wall portion 15d of the reverse inclined groove 15, an acute angle portion 13D which is formed by the wall portion 15b and the side wall portion 15c of the reverse inclined groove 15, and an obtuse angle portion 13E which is formed by the wall portion 15b and the side wall portion 15d of the reverse inclined groove 15 and the acute angle portion 13D is located on the outer radial side of the acute angle portion 13C and the downstream side in the reverse rotation direction of the rotating seal ring 20. Further, the angle of the acute angle portion 13D is smaller than that of the acute angle portion 13C.

Further, the extension length of the reverse inclined groove 15 is shorter than the extension length of the inclined groove 14. That is, the length of each of the side wall portions 15c and 15d of the reverse inclined groove 15 is shorter than the length of each of the side wall portions 14c and 14d of the continuous inclined groove 14.

Further, the depth of the reverse inclined groove 15 is the same as the depth of the inclined groove 14. That is, the bottom surface 15a of the reverse inclined groove 15 is disposed on the same plane as the bottom surface 14a of the continuous inclined groove 14 and forms a flat surface. In addition, the bottom surface 14a of the inclined groove 14 and the bottom surface 15a of the reverse inclined groove 15 are not limited to the one forming the flat surface and may have an inclination or unevenness.

As shown in FIG. 3, the fluid introduction groove 16 includes a liquid guide groove portion 17 which communicates with the outer space S2 and a Rayleigh step 18 which is a dynamic pressure generation portion extending in the circumferential direction concentrically with the stationary seal ring 10 from the inner radial side of the liquid guide groove portion 17 toward the normal rotation direction of the rotating seal ring 20. In addition, the liquid guide groove portion 17 and the Rayleigh step 18 are formed to have substantially the same depth as the depth dimension of the dynamic pressure generation groove 13. Further, the circumferential length of the Rayleigh step 18 is formed to be longer than the circumferential length of the liquid guide groove portion 17 or the circumferential length of one dynamic pressure generation groove 13.

Next, the operation during the relative rotation of the stationary seal ring 10 and the rotating seal ring 20 will be described with reference to FIGS. 4 and 5. Additionally, in this embodiment, the rotating seal ring 20 will be described in order of the stop state, the normal rotation state, and the reverse rotation state.

First, the sealing target fluid F flows into the fluid introduction groove 16 in the stop state in which the rotating seal ring 20 does not rotate. In addition, since the elastic member 7 urges the stationary seal ring 10 toward the rotating seal ring 20, the sliding surfaces 11 and 21 are in the contact state and the sealing target fluid F between the sliding surfaces 11 and 21 substantially does not leak to the inner space S1.

Figure 4:
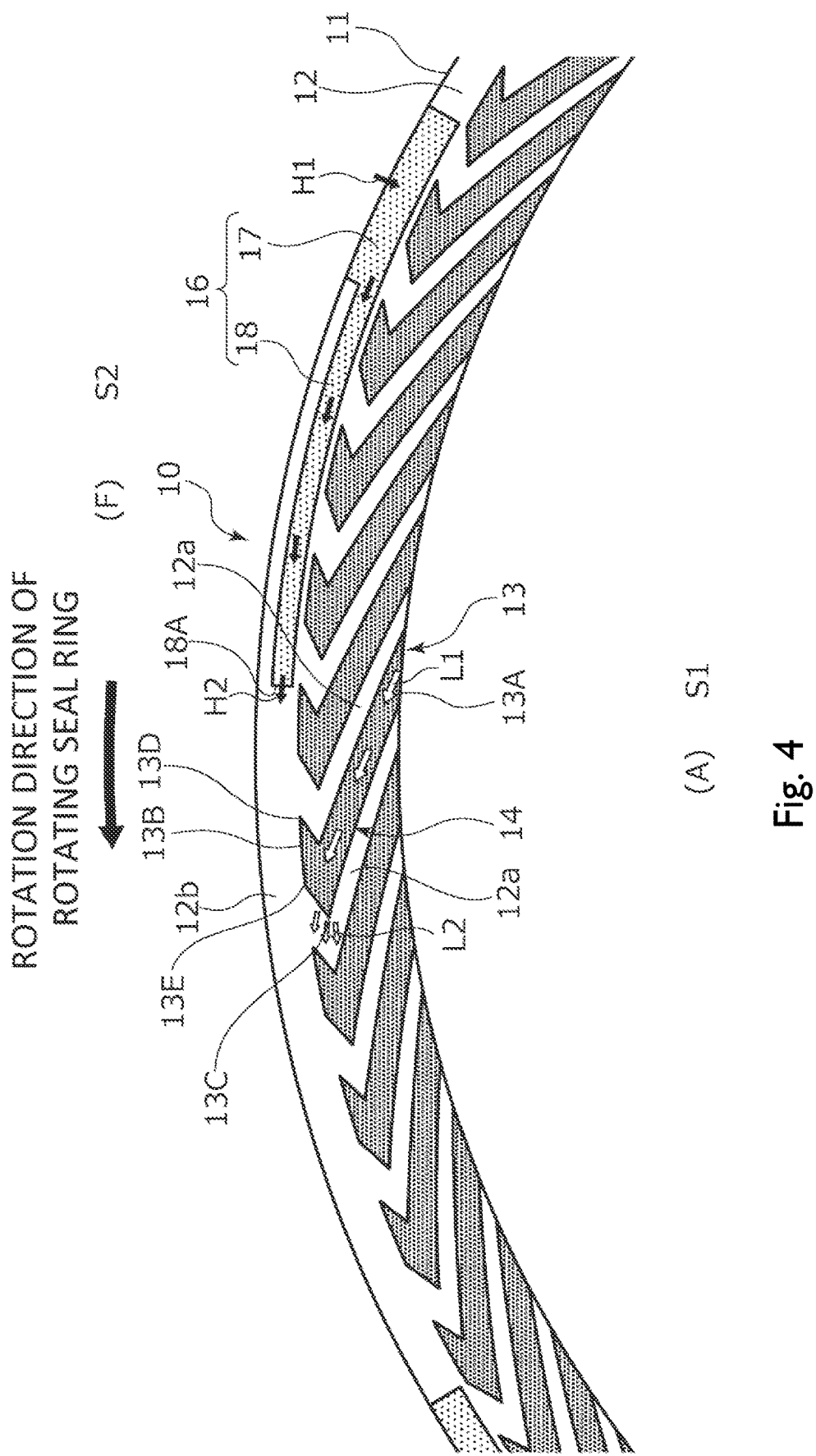
FIG. 4 is an explanatory diagram of the sliding surface of the stationary seal ring of the first embodiment as viewed from the axial direction of the movement of a fluid of an inclined groove and a reverse inclined groove in a normal rotation state.

As shown in FIG. 4, since the sealing target fluid F in the Rayleigh step 18 moves in a following manner in the normal rotation direction of the rotating seal ring 20 due to shearing with the sliding surface 21 at the low speed immediately after the rotating seal ring 20 starts to rotate in the normal rotation direction relative to the stationary seal ring 10, the sealing target fluid F in the outer space S2 is drawn into the liquid guide groove portion 17. That is, in the fluid introduction groove 16, the sealing target fluid F moves from the liquid guide groove portion 17 toward the downstream end portion 18A in the relative rotation direction of the Rayleigh step 18 as indicated by the arrow H1. In addition, the flow of the sealing target fluid F or the atmosphere A of FIG. 4 is schematically shown without specifying the relative rotation speed of the rotating seal ring 20.

The pressure of the sealing target fluid F having moved toward the end portion 18A of the Rayleigh step 18 is increased at the end portion 18A of the Rayleigh step 18 and in the vicinity thereof. That is, a positive pressure is generated at the end portion 18A of the Rayleigh step 18 and in the vicinity thereof.

Since the depth of the Rayleigh step 18 is shallow, a positive pressure is generated at the end portion 18A of the Rayleigh step 18 and in the vicinity thereof even when the movement amount of the sealing target fluid F is small when the rotation speed of the rotating seal ring 20 is low.

Further, the sliding surfaces 11 and 21 are slightly separated from each other by a force caused by the positive pressure generated at the end portion 18A of the Rayleigh step 18 and in the vicinity thereof. Accordingly, the sealing target fluid F in the fluid introduction groove 16 indicated by the arrow H2 mainly flows between the sliding surfaces 11 and 21. In this way, since the sealing target fluid F is interposed between the sliding surfaces 11 and 21, lubricity is improved even at a low-speed rotation and the wear between the sliding surfaces 11 and 21 can be suppressed.

Additionally, since the levitation distance between the sliding surfaces 11 and 21 is small, the amount of the sealing target fluid F leaking into the inner space S1 is small. Further, since the liquid guide groove portion 17 is provided, a large amount of the sealing target fluid F can be held and poor lubrication between the sliding surfaces 11 and 21 can be prevented at the low-speed rotation.

On the other hand, in the dynamic pressure generation groove 13, when the relative rotation speed of the rotating seal ring 20 and the stationary seal ring 10 is low, the atmosphere A is not sufficiently dense in the dynamic pressure generation groove 13, a high positive pressure is not generated, and a force caused by the positive pressure generated by the dynamic pressure generation groove 13 is relatively smaller than a force caused by the positive pressure generated at the end portion 18A of the Rayleigh step 18 and in the vicinity thereof. Thus, when the rotating seal ring 20 rotates at a low speed, a force caused by the positive pressure generated at the end portion 18A of the Rayleigh step 18 and in the vicinity thereof mainly serves to separate the sliding surfaces 11 and 21 from each other.

When the relative rotation speed of the rotating seal ring 20 increases, as shown in FIG. 4, the atmosphere A in the dynamic pressure generation groove 13 moves in a following manner in the normal rotation direction of the rotating seal ring 20 due to shearing with the sliding surface 21 and the atmosphere A of the inner space S1 is drawn into the dynamic pressure generation groove 13. That is, in the dynamic pressure generation groove 13, a large amount of the atmosphere A moves from the inner radial end 13A toward the end portion on the outer radial side of the inclined groove 14 as indicated by the arrow L1.

The pressure of the atmosphere A having moved toward the outer radial end portion of the inclined groove 14 increases at the acute angle portion 13C and in the vicinity thereof. That is, a positive pressure is generated at the acute angle portion 13C and in the vicinity thereof.

In this way, a force caused by the positive pressure generated at the acute angle portion 13C and in the vicinity thereof is added to a force caused by the positive pressure generated at the end portion 18A of the Rayleigh step 18 and in the vicinity thereof and the sliding surfaces 11 and 21 are further separated from each other compared to a low-speed state. Accordingly, the atmosphere A in the dynamic pressure generation groove 13 indicated by the arrow L2 mainly flows between the sliding surfaces 11 and 21.

Since the atmosphere A in the dynamic pressure generation groove 13 indicated by the arrow L2 acts to push back the sealing target fluid F in the vicinity of the acute angle portion 13C of the dynamic pressure generation groove 13 toward the outer space S2, the amount of the sealing target fluid F leaking into the dynamic pressure generation groove 13 or the inner space S1 is small.

Since the sliding component of this embodiment is designed so that the positive pressure generation ability of the entire inclined groove 14 at the high-speed rotation in the normal rotation direction is sufficiently larger than the positive pressure generation ability of the entire reverse inclined groove 15 and the positive pressure generation ability of the entire Rayleigh step 18, only the atmosphere A finally exists between the sliding surfaces 11 and 21, that is, a gas lubrication is performed.

Next, the reverse rotation state of the rotating seal ring 20 will be described with reference to FIG. 5. As shown in FIG. 5, when the rotating seal ring 20 rotates in the reverse rotation direction relative to the stationary seal ring 10, the sealing target fluid F in the Rayleigh step 18 moves in a following manner in the reverse rotation direction of the rotating seal ring 20 due to shearing with the sliding surface 21 and enters the liquid guide groove portion 17 on the downstream side in the relative rotation direction and a part of the sealing target fluid F in the liquid guide groove portion 17 flows out to the outer space S2. In addition, the flow of the sealing target fluid F or the atmosphere A of FIG. 5 is schematically shown without specifying the relative rotation speed of the rotating seal ring 20.

Further, at this time, the sealing target fluid F existing at the land portion 12b between the adjacent fluid introduction grooves 16 or the land portion 12c between the dynamic pressure generation groove 13 and the fluid introduction groove 16 separated from each other in the radial direction is sucked into the fluid introduction groove 16 as indicated by the arrow H2' due to the negative pressure generated at the end portion 18A of the Rayleigh step 18 and in the vicinity thereof and this tendency becomes remarkable in the vicinity of the end portion 18A.

In this way, when the rotating seal ring 20 rotates counterclockwise in the reverse rotation direction relative to the stationary seal ring 10, a large amount of the sealing target fluid F sucked into the fluid introduction groove 16 is held in the liquid guide groove portion 17 and poor lubrication between the sliding surfaces 11 and 21 can be prevented.

Figure 5:
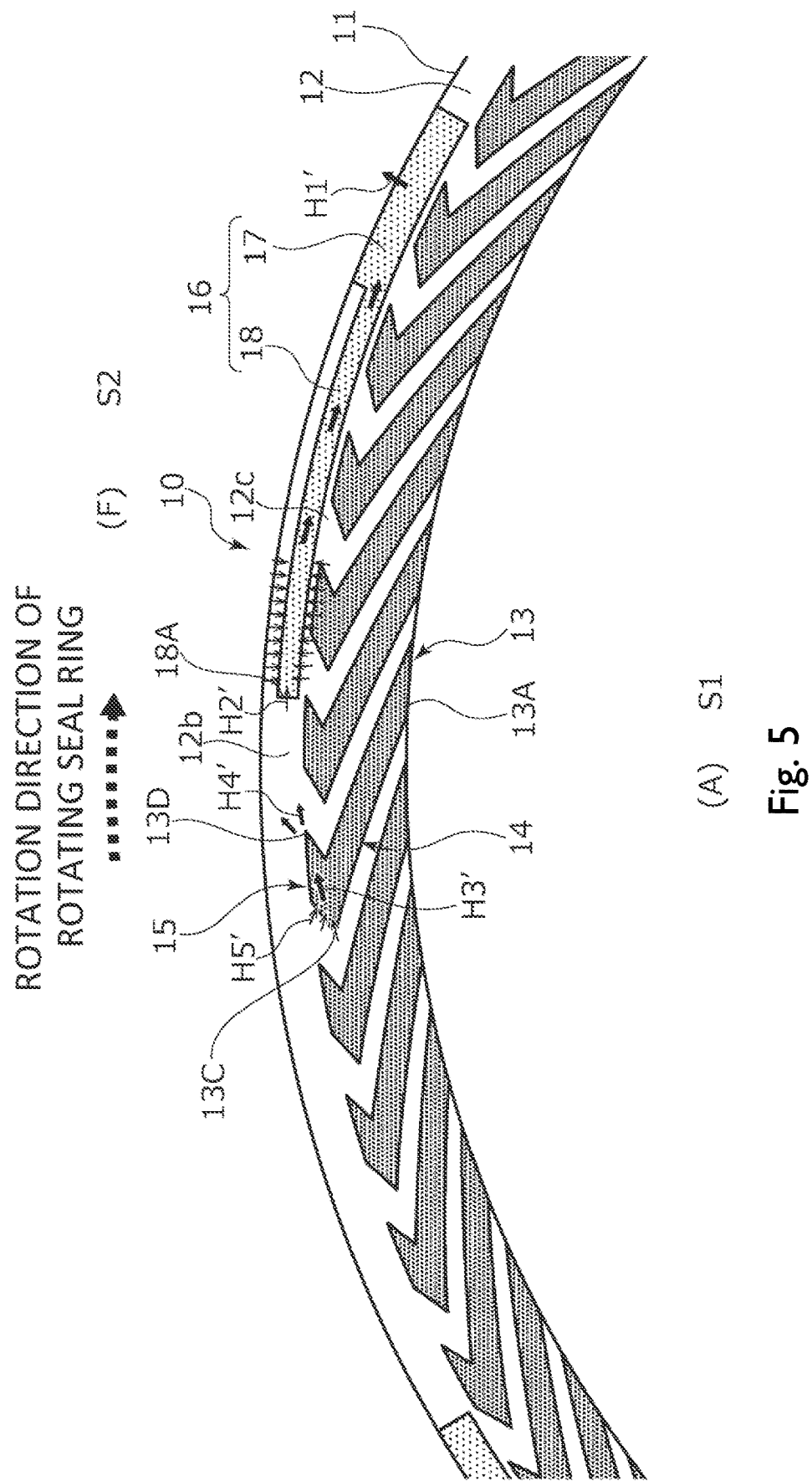
FIG. 5 is an explanatory diagram of the sliding surface of the stationary seal ring of the first embodiment as viewed from the axial direction of the movement of the fluid in the inclined groove and the reverse inclined groove in a reverse rotation state.

On the other hand, in the dynamic pressure generation groove 13, as shown in FIG. 5, the sealing target fluid F having entered the reverse inclined groove 15 formed on the outer radial side of the dynamic pressure generation groove 13 moves in a following manner in the reverse rotation direction of the rotating seal ring 20 due to shearing with the sliding surface 21. That is, in the dynamic pressure generation groove 13, the sealing target fluid F moves toward the acute angle portion 13D through the reverse inclined groove 15 as indicated by the arrow H3'.

The pressure of the sealing target fluid F having moved toward the acute angle portion 13D is increased at the acute angle portion 13D and in the vicinity thereof. That is, a positive pressure is generated at the acute angle portion 13D and in the vicinity thereof.

Further, the sliding surfaces 11 and 21 are slightly separated from each other due to a force caused by the positive pressure generated at the acute angle portion 13D and in the vicinity thereof. Accordingly, the sealing target fluid F in the reverse inclined groove 15 indicated by the arrow H4' mainly flows between the sliding surfaces 11 and 21.

Since the sealing target fluid F flowing out of the acute angle portion 13D as indicated by the arrow H4' acts to push back the sealing target fluid F in the vicinity of the acute angle portion 13D of the dynamic pressure generation groove 13 toward the outer space S2, the amount of the sealing target fluid F leaking into the dynamic pressure generation groove 13 or the inner space S1 is small.

Further, at this time, the sealing target fluid F existing in the periphery of the acute angle portion 13C is sucked into the reverse inclined groove 15 as indicated by the arrow H5' due to the negative pressure generated at the acute angle portion 13C and in the vicinity thereof. The sealing target fluid F sucked into the reverse inclined groove 15 is returned between the sliding surfaces 11 and 21 from the acute angle portion 13D.

In addition, in the inclined groove 14, since the inner radial end 13A is opened to the inner space S1, the negative pressure generated in the inclined groove 14 during the reverse rotation of the rotating seal ring 20 decreases. Further, since the inclined groove 14 and the reverse inclined groove 15 are continuous grooves, the sealing target fluid F having entered the dynamic pressure generation groove 13 is returned between the sliding surfaces 11 and 21 from the acute angle portion 13D toward the outer radial side due to the flow of the sealing target fluid F in the reverse inclined groove 15 during the reverse rotation of the rotating seal ring 20. Accordingly, the amount of the sealing target fluid F leaking to the inner space S1 through the inclined groove 14 can be reduced.

As described above, when the rotating seal ring 20 starts to rotate relative to the stationary seal ring 10, the sliding surfaces 11 and 21 are lubricated by the sealing target fluid F flowing out between the sliding surfaces 11 and 21 from the fluid introduction groove 16. When the rotating seal ring rotates at a high speed, the sliding surfaces 11 and 21 are separated from each other by the positive pressure generated by the atmosphere A in the dynamic pressure generation groove 13. Accordingly, it is possible to suppress the wear between the sliding surfaces 11 and 21 from the start of the relative rotation to the high-speed rotation.

Further, when the rotating seal ring 20 rotates in the normal rotation direction, the sealing target fluid F having flowed between the sliding surfaces 11 and 21 from the outer space S2 is sucked and pushed back toward the outer space S2 due to the positive pressure mainly generated in the inclined groove 14 of the dynamic pressure generation groove 13. Accordingly, it is possible to suppress the sealing target fluid F from leaking to the inner space S1 from between the sliding surfaces 11 and 21. On the other hand, when the rotating seal ring 20 rotates in the reverse rotation direction, the sealing target fluid F having entered the reverse inclined groove 15 on the outer radial side of the inclined groove 14 moves in a following manner due to shearing with the sliding surface 21 of the rotating seal ring 20 and is returned between the sliding surfaces 11 and 21 from the end portion on the side of the sealing target fluid F of the reverse inclined groove 15, that is, the acute angle portion 13D toward the outer radial side. Accordingly, it is possible to reduce the leakage of the sealing target fluid F toward the inner space S1. In this way, since the dynamic pressure generation groove 13 includes the inclined groove 14 and the reverse inclined groove 15 having different rotation directions for generating the main dynamic pressure, it is possible to suppress the wear by separating the sliding surfaces 11 and 21 from each other during both rotations and to suppress the sealing target fluid F from leaking to the inner space S1 from between the sliding surfaces 11 and 21.

Further, since the dynamic pressure generation groove 13 is formed in an L shape by the inclined groove 14 and the reverse inclined groove 15, it is possible to generate a positive pressure by allowing the acute angle portion 13C to accumulate the sealing target fluid F sucked from the acute angle portion 13D to the reverse inclined groove 15 along with the atmosphere A sucked from the inner radial end 13A to the inclined groove 14 in the normal rotation state. Further, since the sealing target fluid F can be pushed back toward the outer space S2 by the dynamic pressure generated in the reverse inclined groove 15 in the reverse rotation state, it is possible to suppress the sealing target fluid F from entering the inclined groove 14 and to suppress the sealing target fluid F from leaking to the inner space S1 through the inclined groove 14.

Further, the inclined groove 14 communicates with the inner space S1. Accordingly, since the atmosphere A of the inner space S1 is easily introduced from the inner radial end 13A to the inclined groove 14 and the positive pressure is easily generated in the inclined groove 14 by the atmosphere A in the normal rotation state, it is possible to increase the dynamic pressure effect.

Further, the extension length of the reverse inclined groove 15 is shorter than that of the inclined groove 14. Accordingly, it is possible to generate a positive pressure by the reverse inclined groove 15 at an early time in the reverse rotation state.

Further, the reverse inclined groove 15 is a groove including the acute angle portion 13D of which the outer radial end portion is tapered. Accordingly, since it is easy to generate a positive pressure by concentrating the sealing target fluid F in the reverse inclined groove 15 on the acute angle portion 13D in the reverse rotation state, it is possible to increase the dynamic pressure effect.

Further, the fluid introduction groove 16 includes the Rayleigh step 18 as the dynamic pressure generation portion. Accordingly, since it is possible to generate the dynamic pressure by the Rayleigh step 18 in the normal rotation state so that the sliding surfaces 11 and 21 are slightly separated from each other and the sealing target fluid F can be introduced between the sliding surfaces 11 and 21, it is possible to improve the lubricity between the sliding surfaces 11 and 21. Further, since the liquid guide groove portion 17 of the fluid introduction groove 16 communicates with the outer space S2, it is easy to introduce the sealing target fluid F into the liquid guide groove portion 17 and to generate the positive pressure by the Rayleigh step 18 at an early time.

Further, since the Rayleigh step 18 can suck the sealing target fluid F in the periphery of the end portion 18A by the negative pressure in the reverse rotation state and introduce the sealing target fluid into the liquid guide groove portion 17, it is possible to suppress the sealing target fluid F from leaking to the inner space S1.

Figure 6:
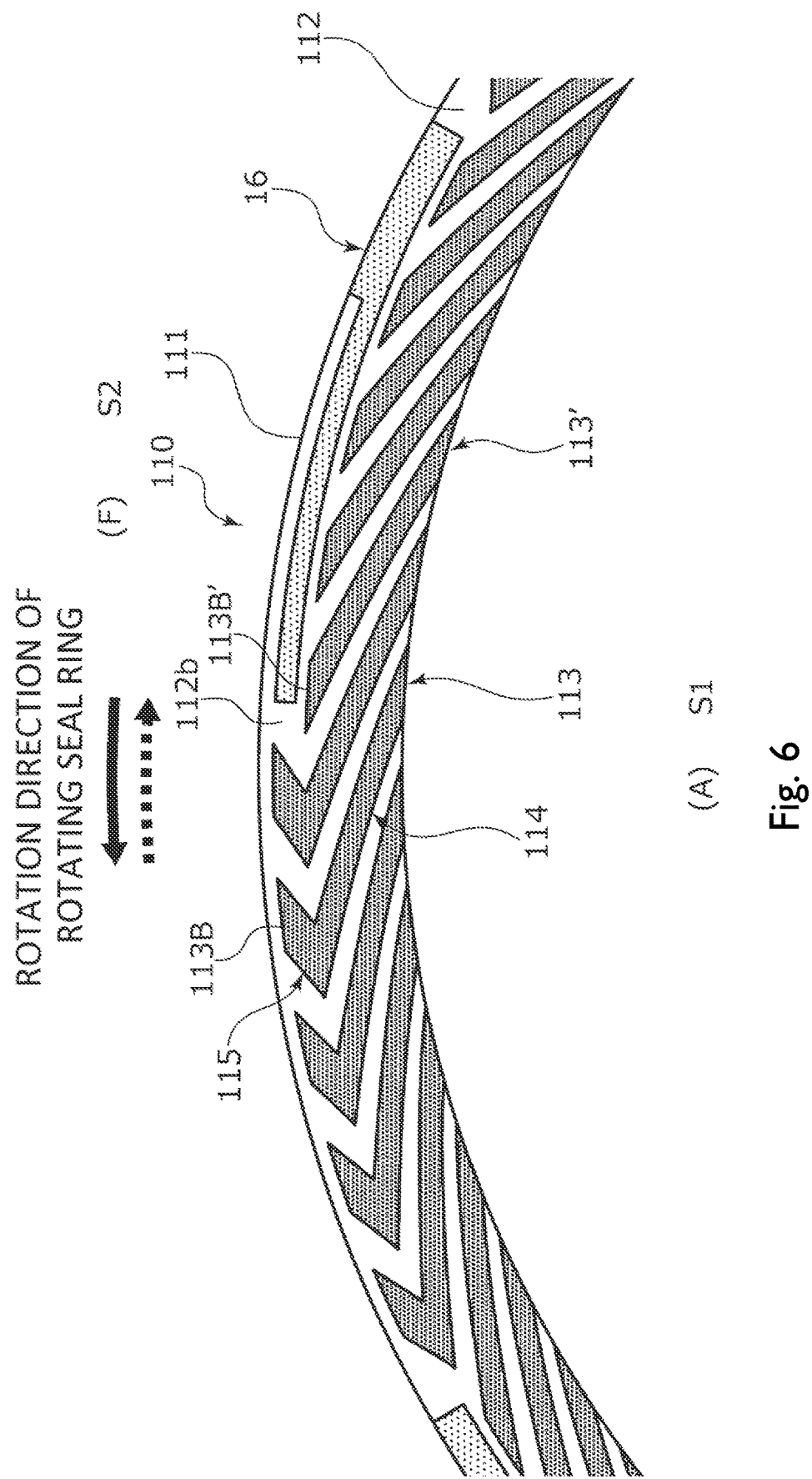
FIG. 6 is an enlarged view of a sliding surface of a stationary seal ring of a first modified example of the first embodiment as viewed from the axial direction.

In addition, as a first modified example of the stationary seal ring 10, a sliding surface 111 of a stationary seal ring 110 which is a sliding component shown in FIG. 6 is provided with an inclined groove 114 having a dynamic pressure generation groove 113 of which an outer radial end 113B extends to a land portion 112b between the fluid introduction grooves 16 adjacent to each other in the circumferential direction and which extends from the inner radial side toward the outer radial side to generate a dynamic pressure and a reverse inclined groove 115 continuously formed on the outer radial side of the inclined groove 114 and extending in the reverse direction with respect to the inclined groove 114 to generate a dynamic pressure. Further, an inclined groove 113' of which an outer radial end 113B' is disposed on the inner radial side of the fluid introduction groove 16 extends from the inner radial side toward the outer radial side and generates a dynamic pressure.

Accordingly, since the reverse inclined groove is not formed in the inclined groove 113' disposed on the inner radial side of the fluid introduction groove 16 having a small leakage amount of the sealing target fluid F and the dynamic pressure generation groove 113 is formed such that the reverse inclined groove 115 extends to the land portion 112b between the fluid introduction grooves 16 adjacent to each other in the circumferential direction compared to the stationary seal ring 10 of the first embodiment, it is possible to form the long extension length of the inclined grooves 114 and the inclined grooves 113' of all dynamic pressure generation grooves 113. Accordingly, it is possible to increase the dynamic pressure effect due to the atmosphere A in the normal rotation state.

Figure 7:
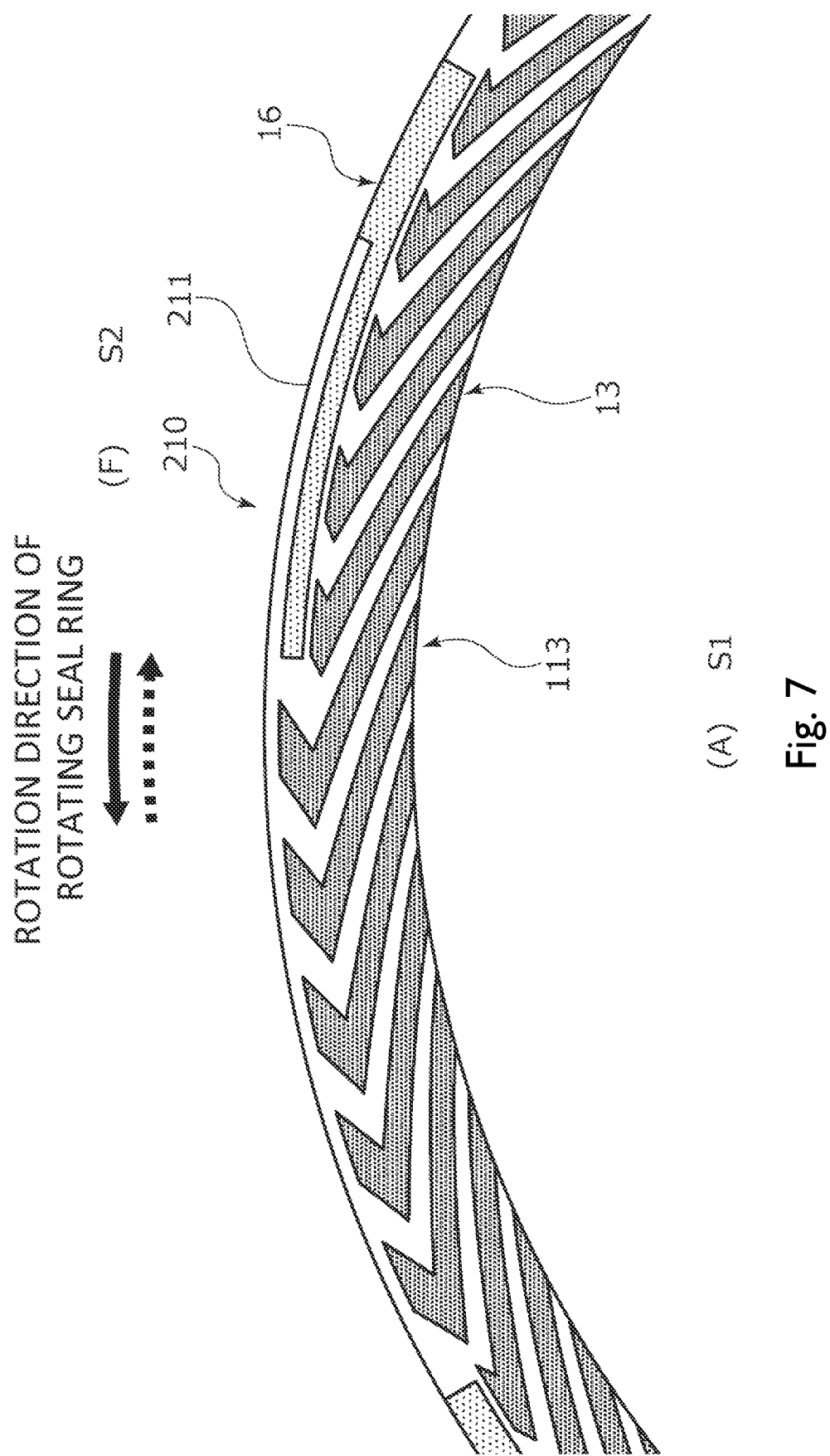
FIG. 7 is an enlarged view of a sliding surface of a stationary seal ring of a second modified example of the first embodiment as viewed from the axial direction.

Further, as a second modified example of the stationary seal ring 10, a sliding surface 211 of a stationary seal ring 210 which is a sliding component shown in FIG. 7 may be provided with a combination of the dynamic pressure generation groove 13 which is the same as the first embodiment and is provided as the dynamic pressure generation groove having an outer radial end disposed on the inner radial side of the fluid introduction groove 16 and the dynamic pressure generation groove 113 which is the same as the first modified example and is the dynamic pressure generation groove having an outer radial end disposed between the fluid introduction grooves 16 adjacent to each other in the circumferential direction. Accordingly, it is possible to increase the dynamic pressure effect due to the atmosphere A in the normal rotation state.

Figure 8:
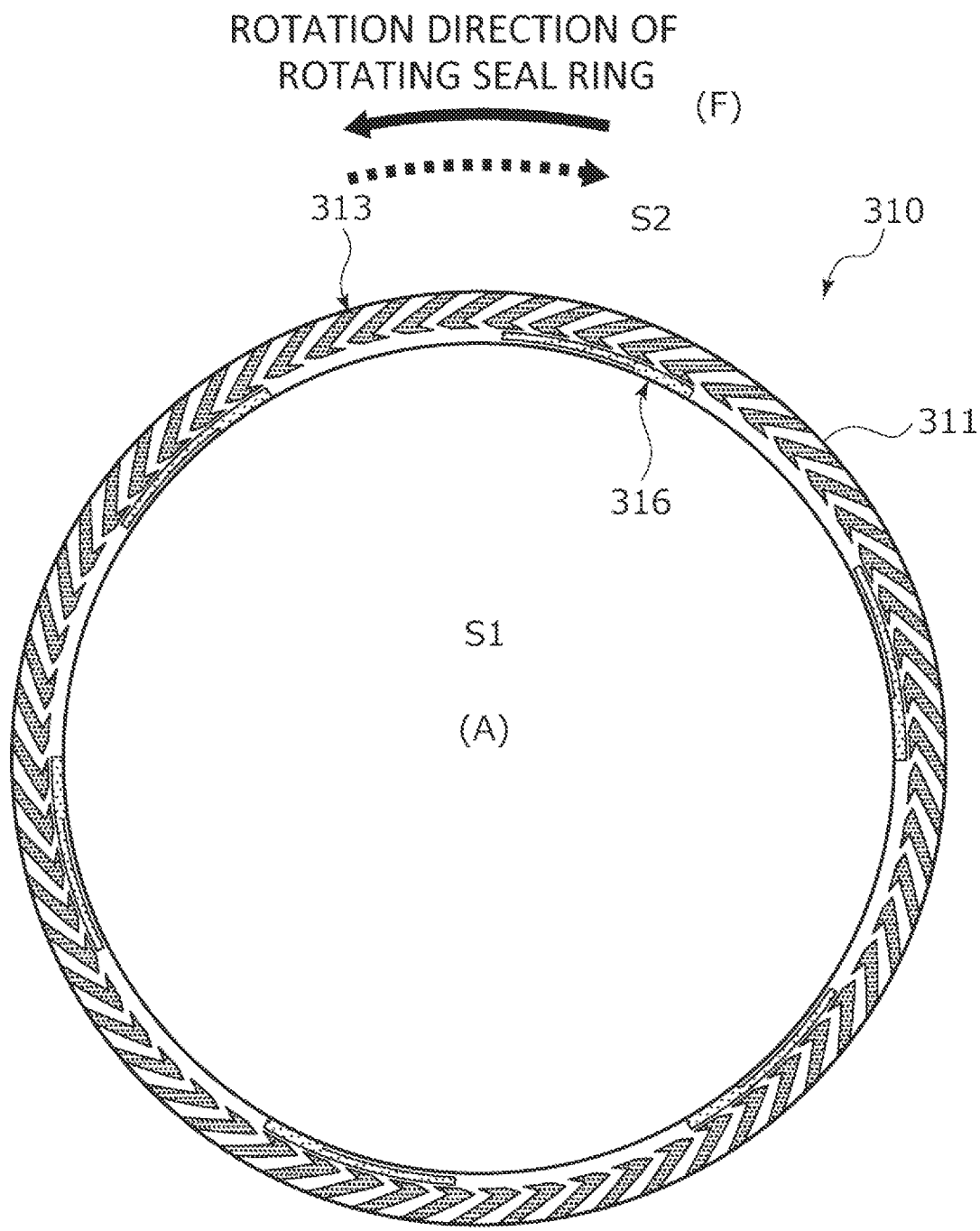
FIG. 8 is a view of a sliding surface of a stationary seal ring of a third modified example of the first embodiment as viewed from the axial direction.

Further, as a third modified example of the stationary seal ring 10, a sliding surface 311 of a stationary seal ring 310 which is a sliding component shown in FIG. 8 is provided with a plurality of fluid introduction grooves 316 evenly arranged on the inner radial side in the circumferential direction and a plurality of dynamic pressure generation grooves 313 evenly arranged on the outer radial side in the circumferential direction and may be applied to the outside type mechanical seal that seals the sealing target fluid F tending to leak from the inner radial side toward the outer radial side of the sliding surface 311. In addition, the dynamic pressure generation groove 313 and the fluid introduction groove 316 are formed by allowing the dynamic pressure generation groove 13 and the fluid introduction groove 16 of the first embodiment to be inverted inside and outside. Further, even in the first and second modified examples, as in the third modified example, the dynamic pressure generation groove and the fluid introduction groove may be inverted inside and outside so that they can be applied to the outside type mechanical seal.

In addition, the configurations of the dynamic pressure generation groove or the fluid introduction groove of the first to third modified examples can also be applied to the sliding surfaces of the sliding components of each subsequent embodiment.

Second Embodiment

Next, a sliding component according to a second embodiment of the present invention will be described with reference to FIGS. 9 to 11. In addition, the description of the configuration that is the same as that of the first embodiment and is duplicated will be omitted.

Figure 9:
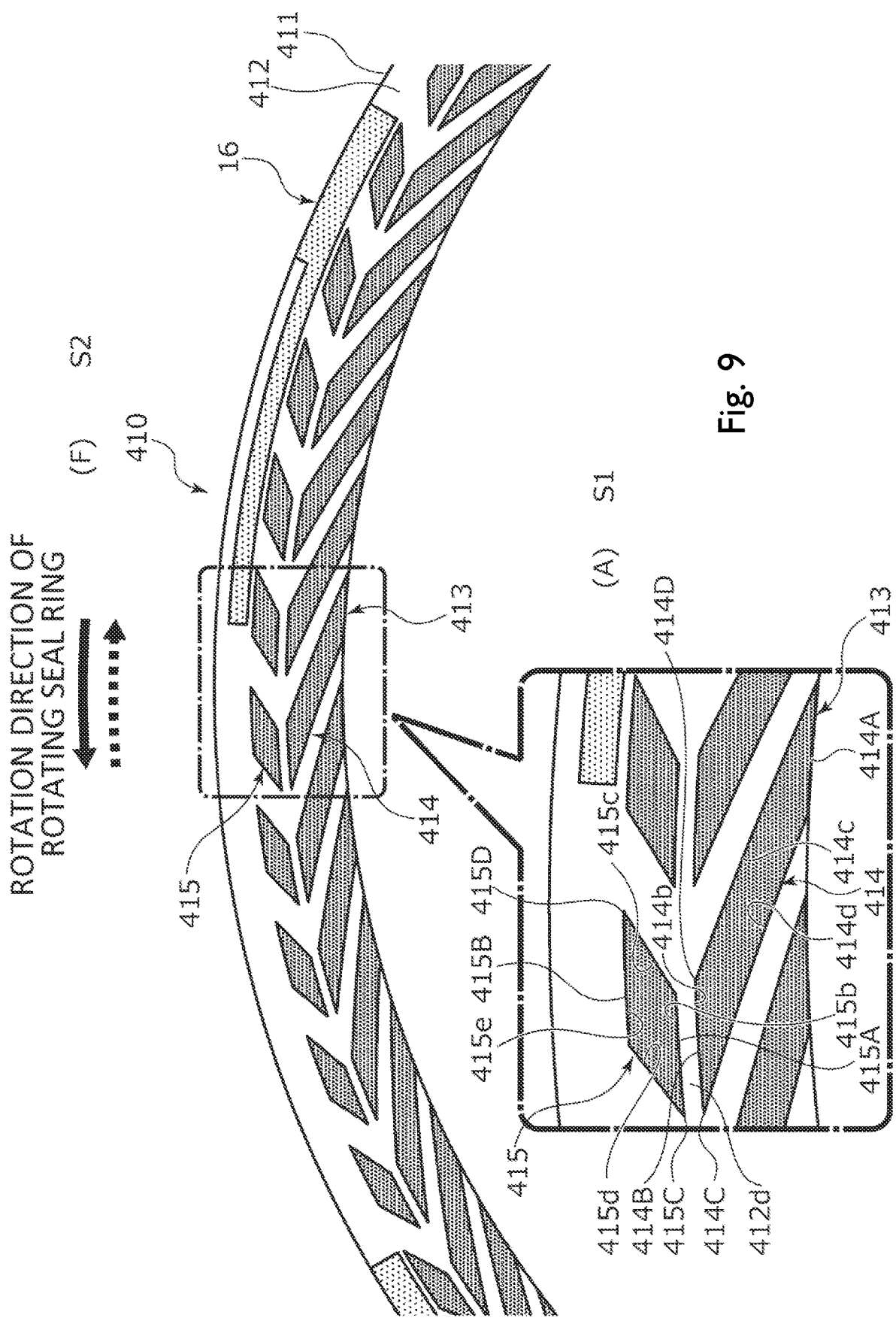
FIG. 9 is an enlarged view of a sliding surface of a stationary seal ring as a sliding component according to a second embodiment of the present invention as viewed from the axial direction.

As shown in FIG. 9, a dynamic pressure generation groove 413 of a stationary seal ring 410 of the second embodiment includes an inclined groove 414 which extends from the inner radial side toward the outer radial side and generates a dynamic pressure and a reverse inclined groove 415 which is radially separated on the outer radial side of the inclined groove 414 and extends in the reverse direction with respect to the inclined groove 414 to generate a dynamic pressure. That is, the dynamic pressure generation groove 413 has a configuration in which the inclined groove 414 and the reverse inclined groove 415 are radially separated from each other by an annular land portion 412d to be described later.

Specifically, the inclined groove 414 extends in an arc shape while being inclined in the normal rotation direction of the rotating seal ring 20 from the inner radial end 414A toward the outer radial side while an inner radial end 414A communicates with the inner space S1 and a linear outer radial end 414B of the inclined groove 414 is closed not to communicate with the reverse inclined groove 415.

The reverse inclined groove 415 forms a substantially parallelogram and extends in a linear shape while being inclined from an inner radial end 415A toward the outer radial side and the reverse rotation direction of the rotating seal ring 20 and an outer radial end 415B is closed not to communicate with the outer space S2.

Further, an annular land portion 412d which is continuous in the circumferential direction and has a predetermined radial width or more is formed between the inclined groove 414 and the reverse inclined groove 415. In addition, the annular land portion 412d is also disposed on the same plane similarly to the other land portion and constitutes a flat surface of the land 412.

Further, the inclined groove 414 is provided with an acute angle portion 414C which is formed by a side wall portion 414d and a wall portion 414b at the outer radial end 414B and an obtuse angle portion 414D which is formed by the wall portion 414b and a side wall portion 414c.

Further, the reverse inclined groove 415 is provided with an acute angle portion 415C which is formed by a side wall portion 415d and a wall portion 415b at an inner radial end 415A and an acute angle portion 415D which is formed by a side wall portion 415c and a wall portion 415e at a linear outer radial end 415B and the acute angle portion 415D is located on the outer radial side of the acute angle portion 415C and the downstream side of the rotating seal ring 20 in the reverse rotation direction.

Further, the extension length of the reverse inclined groove 415 is shorter than the extension length of the inclined groove 414. Further, the depth of the reverse inclined groove 415 is the same as the depth of the inclined groove 414. In addition, the reverse inclined groove 415 may be formed to have a depth different from that of the inclined groove 414.

Further, the outer radial end 414B and the inner radial end 415A are arranged at the radially overlapping position to be substantially parallel to each other and to have the substantially same length. It is preferable that the inner radial end 415A is disposed at a position radially overlapping the outer radial end 414B while having a length equal to or larger than the length of the outer radial end from the viewpoint of preventing the leakage.

Next, the operation during the relative rotation between the stationary seal ring 410 and the rotating seal ring 20 will be described with reference to FIGS. 10 and 11. In addition, since the movement of the fluid in the fluid introduction groove 16 is substantially the same as that of the first embodiment, the movement of the fluid in the inclined groove 414 and the reverse inclined groove 415 constituting the dynamic pressure generation groove 413 of this embodiment will be mainly described.

In the dynamic pressure generation groove 413, when the relative rotation speed of the rotating seal ring 20 and the stationary seal ring 410 in the normal rotation direction is low, the atmosphere A is not sufficiently dense in the inclined groove 414 and a high positive pressure is not generated. Further, since the extension length of the reverse inclined groove 415 is short, a high positive pressure is not generated even when the sealing target fluid F enters the reverse inclined groove 415.

Figure 10:
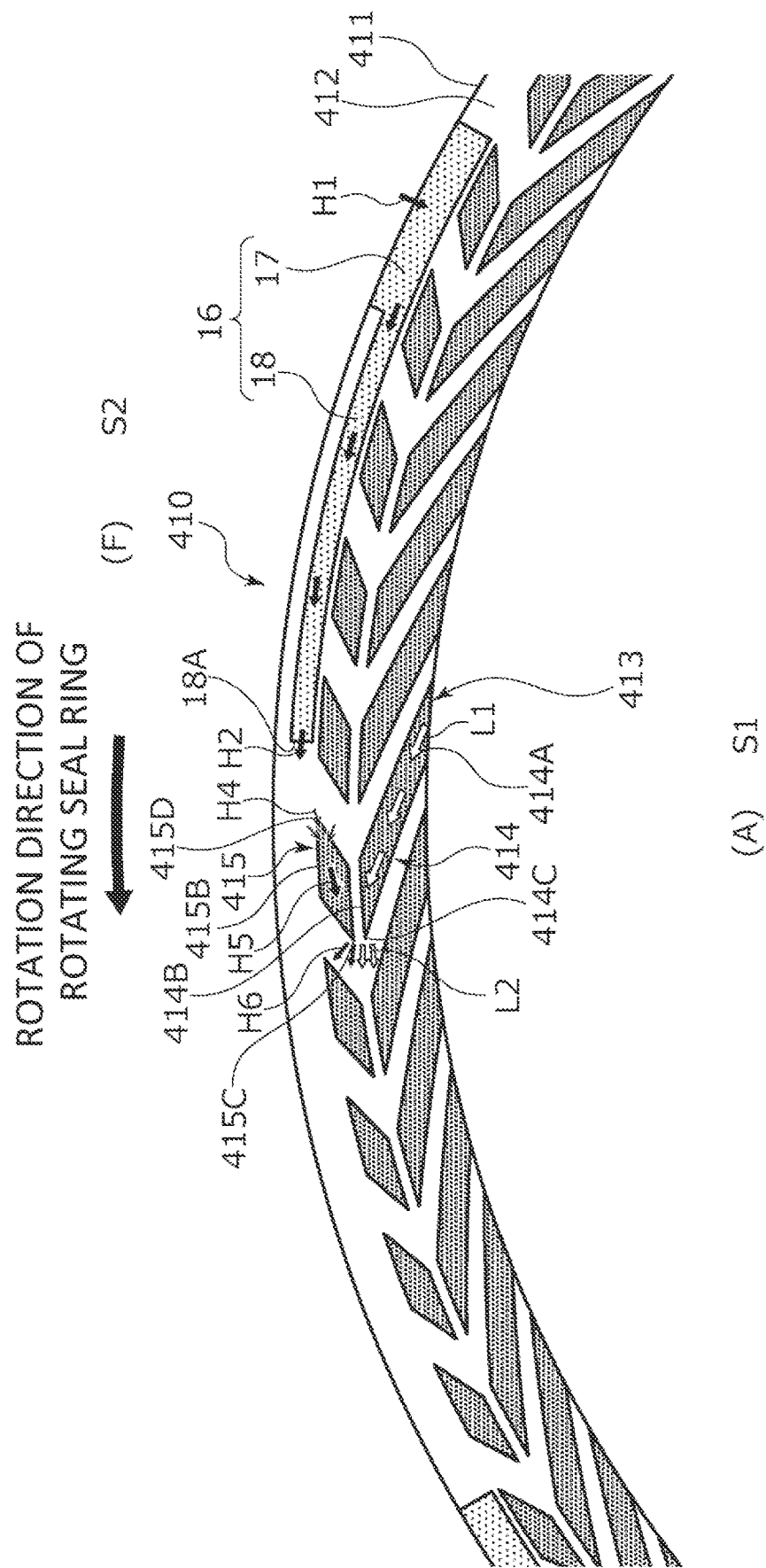
FIG. 10 is an explanatory diagram of the sliding surface of the stationary seal ring of the second embodiment as viewed from the axial direction of the movement of a fluid of an inclined groove and a reverse inclined groove in a normal rotation state.
Figure 11:
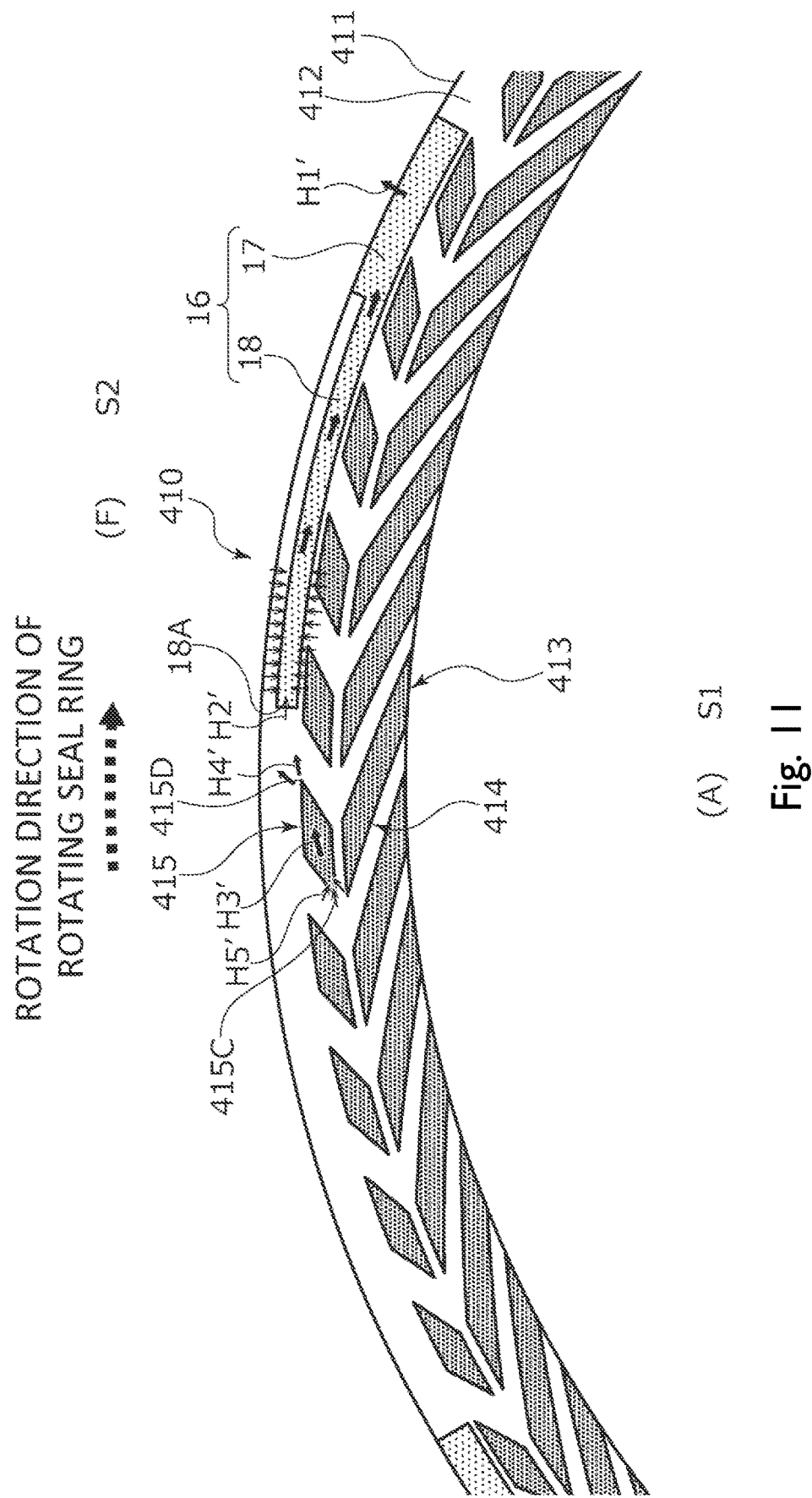
FIG. 11 is an explanatory diagram of the sliding surface of the stationary seal ring of the second embodiment as viewed from the axial direction of the movement of the fluid in the inclined groove and the reverse inclined groove in a reverse rotation state.

When the relative rotation speed of the rotating seal ring 20 increases, the atmosphere A in the inclined groove 414 moves in a following manner in the normal rotation direction of the rotating seal ring 20 due to shearing with the sliding surface 21 and the atmosphere A of the inner space S1 is drawn into the inclined groove 414 as shown in FIG. 10. That is, in the inclined groove 414, a large amount of the atmosphere A moves from the inner radial end 414A toward the outer radial end 414B of the inclined groove 414 as indicated by the arrow L1.

The pressure of the atmosphere A having moved toward the outer radial end 414B of the inclined groove 414 increases at the acute angle portion 414C and in the vicinity thereof. That is, a positive pressure is generated at the acute angle portion 414C and in the vicinity thereof.

Further, since the atmosphere A in the inclined groove 414 indicated by the arrow L2 acts to push back the sealing target fluid F in the vicinity of the acute angle portion 414C toward the outer space S2, the amount of the sealing target fluid F leaking into the inclined groove 414 or the inner space S1 is small.

On the other hand, in the reverse inclined groove 415, the sealing target fluid F having entered the reverse inclined groove 415 moves in a following manner in the normal rotation direction of the rotating seal ring 20 due to shearing with the sliding surface 21 and the sealing target fluid F in the vicinity of the acute angle portion 415D is drawn into the reverse inclined groove 415. That is, in the reverse inclined groove 415, the sealing target fluid F moves from the acute angle portion 415D of the reverse inclined groove 415 toward the acute angle portion 415C as indicated by the arrow H5 so that the pressure at the acute angle portion 415C and in the vicinity thereof increases. That is, a positive pressure is generated at the acute angle portion 415C and in the vicinity thereof.

Further, the sealing target fluid F in the reverse inclined groove 415 indicated by the arrow H6 is pushed back toward the outer space S2 by the atmosphere A in the inclined groove 414 indicated by the arrow L2 together with the sealing target fluid F in the vicinity of the acute angle portion 415C.

Next, the reverse rotation state of the rotating seal ring 20 will be described with reference to FIG. 11. As shown in FIG. 11, the sealing target fluid F having entered the reverse inclined groove 415 formed on the outer radial side of the inclined groove 414 moves in a following manner in the reverse rotation direction of the rotating seal ring 20 due to shearing with the sliding surface 21 and the sealing target fluid F in the vicinity of the acute angle portion 415C is drawn into the reverse inclined groove 415. That is, in the reverse inclined groove 415, the sealing target fluid F moves from the acute angle portion 415C toward the acute angle portion 415D of the reverse inclined groove 415 as indicated by the arrow H3' so that the pressure at the acute angle portion 415D and in the vicinity thereof increases. That is, a positive pressure is generated at the acute angle portion 415D and in the vicinity thereof.

Since the sealing target fluid F in the reverse inclined groove 415 indicated by the arrow H4' acts to push back the sealing target fluid F in the vicinity of the acute angle portion 415D of the reverse inclined groove 415 toward the outer space S2, the amount of the sealing target fluid F leaking into the inclined groove 414 or the inner space S1 is small.

Further, at this time, the sealing target fluid F existing in the periphery of the acute angle portion 415C is sucked into the reverse inclined groove 415 as indicated by the arrow H5' due to the negative pressure generated at the acute angle portion 415C and in the vicinity thereof. The sealing target fluid F sucked into the reverse inclined groove 415 is returned between the sliding surfaces 411 and 21 from the acute angle portion 415D toward the outer radial side.

As described above, when the rotating seal ring 20 rotates in the normal rotation direction, the sealing target fluid F having flowed between the sliding surfaces 411 and 21 from the outer space S2 is sucked and pushed back toward the outer space S2 due to the positive pressure generated in the inclined groove 414 and the reverse inclined groove 415 of the dynamic pressure generation groove 413. Accordingly, it is possible to suppress the sealing target fluid F from leaking to the inner space S1 from between the sliding surfaces 411 and 21. On the other hand, when the rotating seal ring 20 rotates in the reverse rotation direction, the sealing target fluid F having entered the reverse inclined groove 415 on the outer radial side of the inclined groove 414 moves in a following manner due to shearing with the sliding surface 21 of the rotating seal ring 20 and is returned between the sliding surfaces 411 and 21 from the end portion on the side of the sealing target fluid F of the reverse inclined groove 415, that is, the acute angle portion 415D toward the outer radial side. Accordingly, it is possible to reduce the leakage of the sealing target fluid F toward the inner space S1. In this way, since the dynamic pressure generation groove 413 includes the inclined groove 414 and the reverse inclined groove 415 having different rotation directions for generating the main dynamic pressure, it is possible to suppress the wear by separating the sliding surfaces 411 and 21 from each other during both rotations and to suppress the sealing target fluid F from leaking to the inner space S1 from between the sliding surfaces 411 and 21.

Further, since the annular land portion 412d which is continuous in the circumferential direction and has a predetermined radial width or more is formed between the inclined groove 414 and the reverse inclined groove 415, the inclined groove 414 and the reverse inclined groove 415 are separated from each other by the annular land portion 412d, and the sealing target fluid F is sucked and caught into the reverse inclined groove 415 from the acute angle portion 415C on the outer radial side of the annular land portion 412d in the reverse rotation state of the rotating seal ring 20, it is possible to suppress the sealing target fluid F from entering the inclined groove 414 over the annular land portion 412d and to further reduce the sealing target fluid F leaking into the inner space S1 through the inclined groove 414.

Further, since the inclined groove 414 and the reverse inclined groove 415 are separated from each other by the annular land portion 412d, the inclined groove 414 and the reverse inclined groove 415 do not obstruct the generation of the dynamic pressure thereof during both rotations. Accordingly, it is easy to exhibit the dynamic pressure effect.

Further, the radial center of the annular land portion 412d separating the inclined groove 414 and the reverse inclined groove 415 from each other is disposed on the side of the sealing target fluid F in relation to the radial center of the sliding surface 411. Accordingly, since the long extension length of the inclined groove 414 can be ensured and the inclined groove 414 is mainly used to generate a dynamic pressure rather than the reverse inclined groove 415 in the normal rotation state, it is possible to further suppress the leakage of the sealing target fluid F to the inner space S1.

Third Embodiment

Next, a sliding component according to a third embodiment of the present invention will be described with reference to FIG. 12. In addition, the description of the configuration that is the same as those of the first and second embodiments and is duplicated will be omitted.

Figure 12:
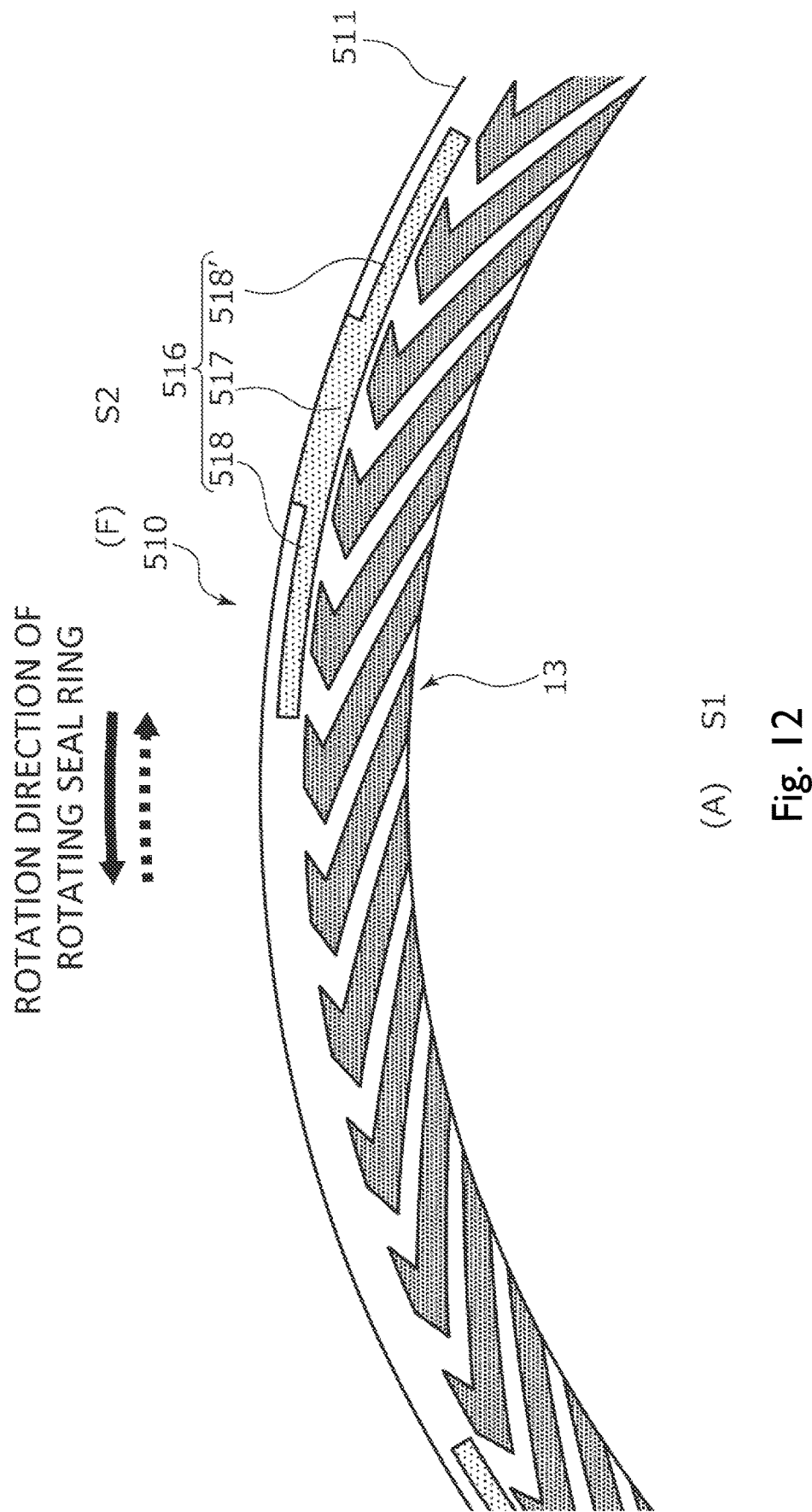
FIG. 12 is an enlarged view of a sliding surface of a stationary seal ring as a sliding component according to a third embodiment of the present invention as viewed from the axial direction.

As shown in FIG. 12, a fluid introduction groove 516 of a stationary seal ring 510 of the third embodiment includes a liquid guide groove portion 517 which communicates with the outer space S2 and Rayleigh steps 518 and 518' which are the dynamic pressure generation portions and respectively extend in the circumferential direction concentrically with the stationary seal ring 510 from the inner radial side of the liquid guide groove portion 517 toward the normal rotation direction and the reverse rotation direction of the rotating seal ring 20.

Accordingly, in the normal rotation state of the rotating seal ring 20, the sealing target fluid F in the fluid introduction groove 516 moves in a following manner in the normal rotation direction of the rotating seal ring 20 due to shearing with the sliding surface 21 to move from the liquid guide groove portion 517 toward the Rayleigh step 518 and the sealing target fluid F of the outer space S2 is drawn into the liquid guide groove portion 517. Further, even in the reverse rotation state, the sealing target fluid F in the fluid introduction groove 516 moves in a following manner in the reverse rotation direction of the rotating seal ring 20 due to shearing with the sliding surface 21 to move from the liquid guide groove portion 517 toward the Rayleigh step 518' and the sealing target fluid F of the outer space S2 is drawn into the liquid guide groove portion 517.

In this way, since the fluid introduction groove 516 generates the dynamic pressure by the Rayleigh steps 518 and 518' during both rotations so that the sliding surfaces 511 and 21 are slightly separated from each other and the sealing target fluid F can be supplied between the sliding surfaces 511 and 21, it is possible to improve the lubricity between the sliding surfaces 511 and 21.

Fourth Embodiment

Next, a sliding component according to a fourth embodiment of the present invention will be described with reference to FIG. 13. In addition, the description of the configuration that is the same as those of the first to third embodiments and is duplicated will be omitted.

Figure 13:
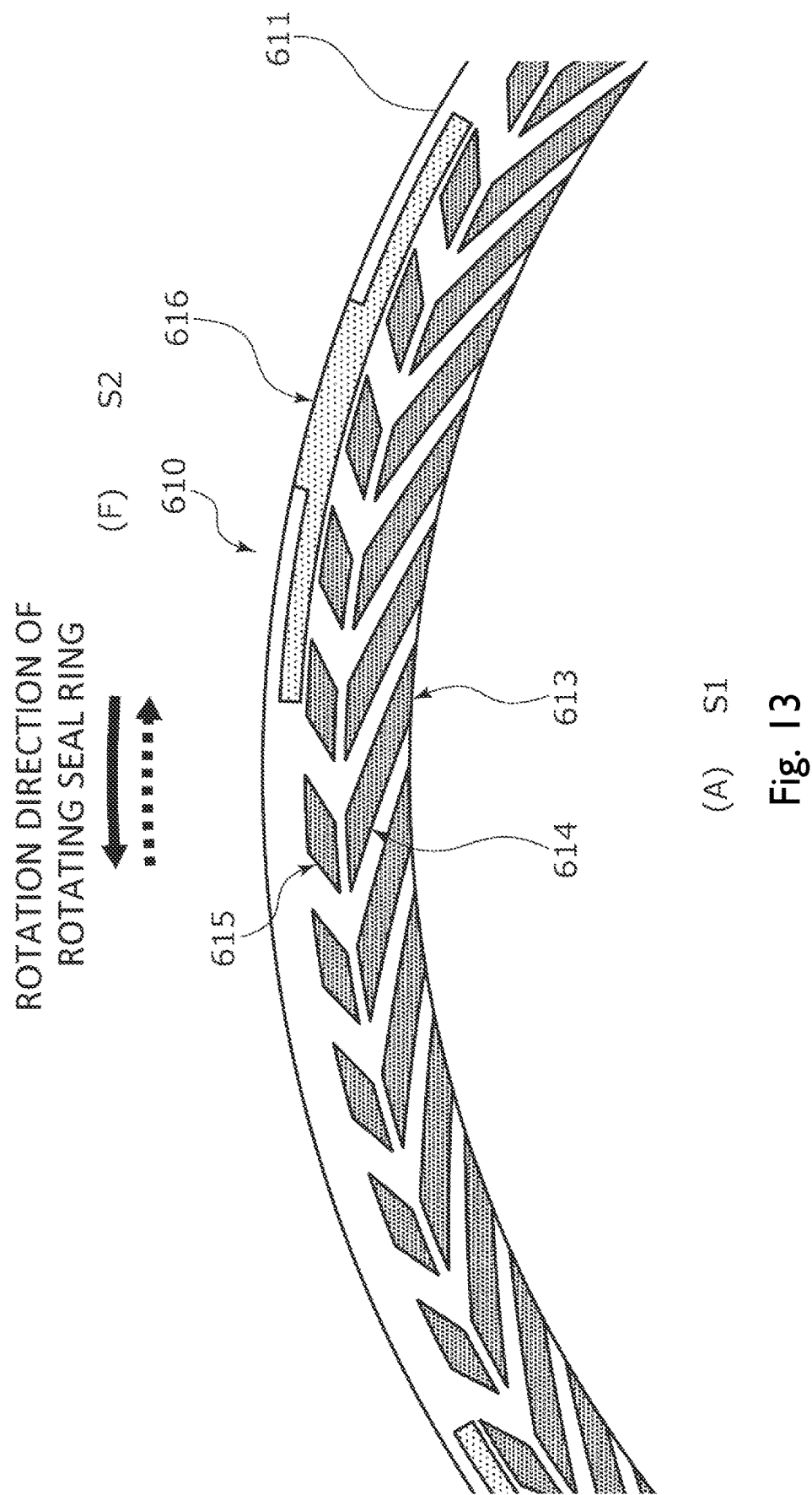
FIG. 13 is an enlarged view of a sliding surface of a stationary seal ring as a sliding component according to a fourth embodiment of the present invention as viewed from the axial direction.

As shown in FIG. 13, a fluid introduction groove 616 of a stationary seal ring 610 of the fourth embodiment has the same configuration as that of the fluid introduction groove 516 of the third embodiment. Further, a dynamic pressure generation groove 613 has the same configuration as that of the dynamic pressure generation groove 413 of the second embodiment.

Accordingly, since the fluid introduction groove 616 slightly separate the sliding surfaces 611 and 21 from each other during both rotations so that the sealing target fluid F is introduced between the sliding surfaces 611 and 21, it is possible to further suppress the wear between the sliding surfaces 611 and 21 and to suppress the leakage of the sealing target fluid F by the inclined groove 614 and the reverse inclined groove 615 separated in the radial direction in the dynamic pressure generation groove 613.

Fifth Embodiment

Next, a sliding component according to a fifth embodiment of the present invention will be described with reference to FIG. 14. In addition, the description of the configuration that is the same as those of the first to fourth embodiments and is duplicated will be omitted.

Figure 14:
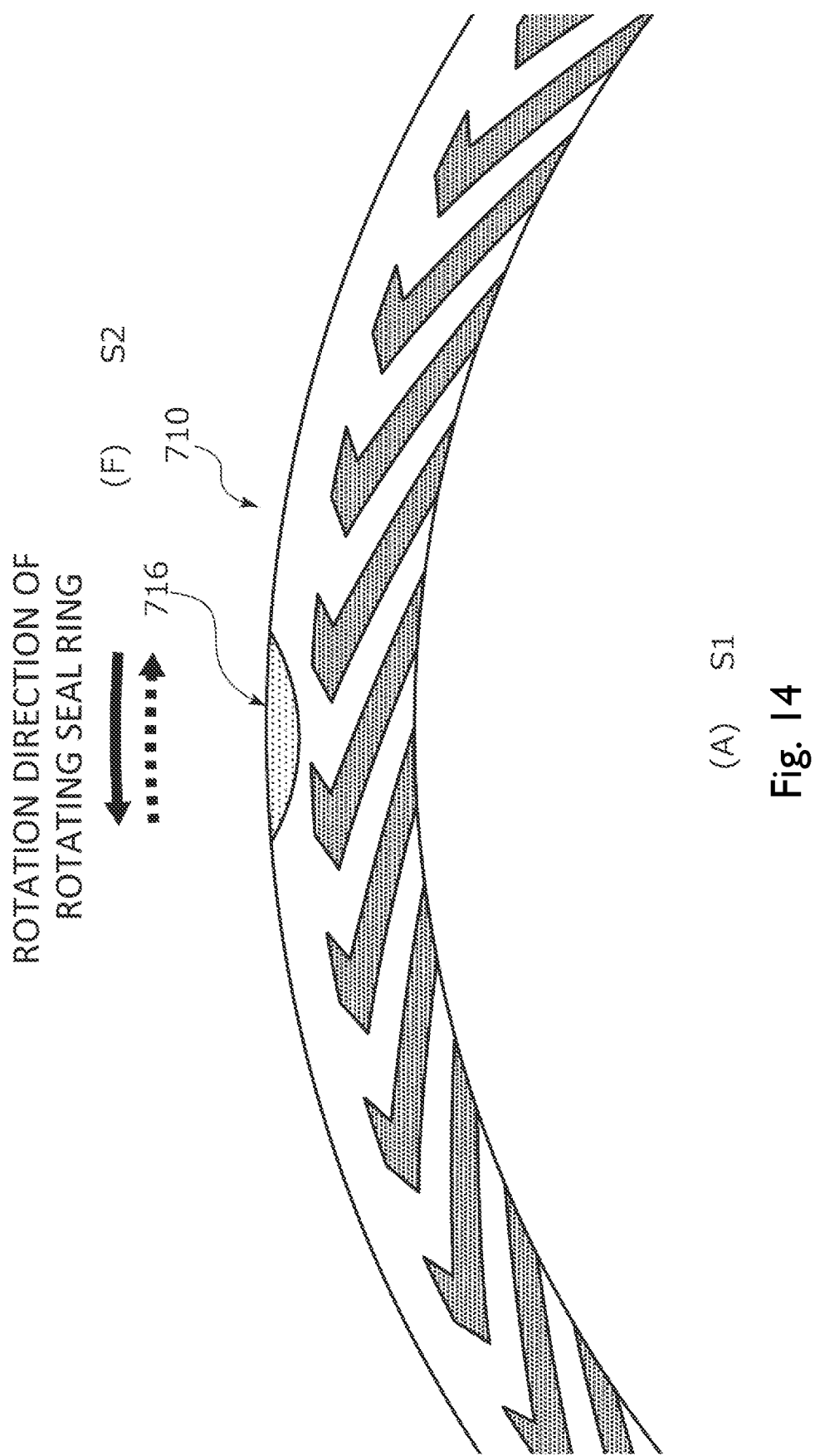
FIG. 14 is an enlarged view of a sliding surface of a stationary seal ring as a sliding component according to a fifth embodiment of the present invention as viewed from the axial direction.

As shown in FIG. 14, a fluid introduction groove 716 of a stationary seal ring 710 of the fifth embodiment is composed of a substantially bow-shaped groove in which a part of a circle is cut off and which communicates with the outer space S2.

Accordingly, since the fluid introduction groove 716 is formed as a groove in which a part of the circle is cut off and which communicates with the outer space S2, the sealing target fluid F is easily introduced into the fluid introduction groove 716 regardless of the rotation direction of the rotating seal ring 20.

Sixth Embodiment

Next, a sliding component according to a sixth embodiment of the present invention will be described with reference to FIG. 15. In addition, the description of the configuration that is the same as those of the first to fifth embodiments and is duplicated will be omitted.

Figure 15:
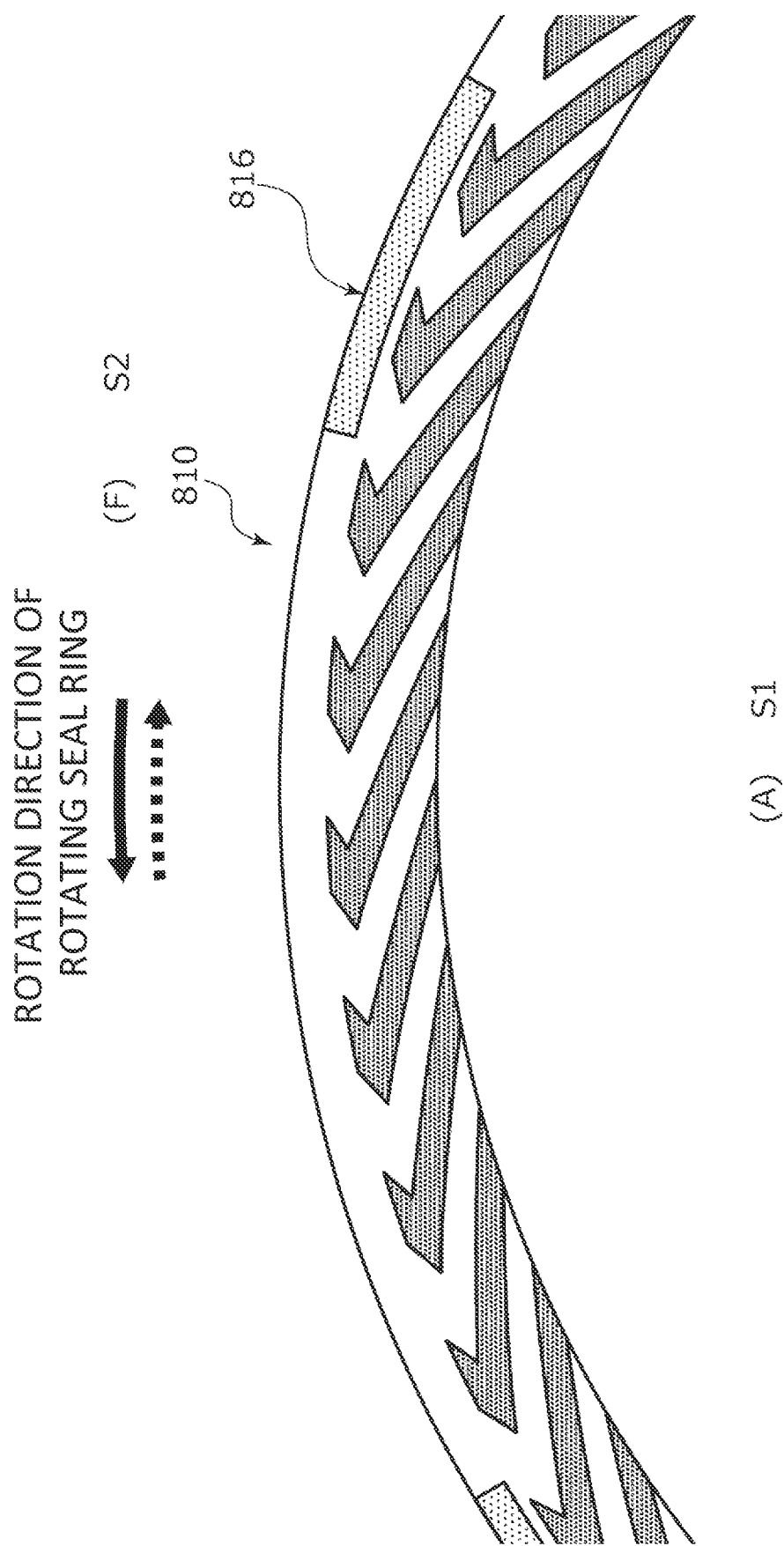
FIG. 15 is an enlarged view of a sliding surface of a stationary seal ring as a sliding component according to a sixth embodiment of the present invention as viewed from the axial direction.

As shown in FIG. 15, a fluid introduction groove 816 of a stationary seal ring 810 of the sixth embodiment is formed as a substantially rectangular groove communicating with the outer space S2.

Accordingly, since the fluid introduction groove 816 is formed as a substantially rectangular groove, it is easy to perform a forming process and it is possible to hold a large amount of the sealing target fluid F in the fluid introduction groove 816.

Seventh Embodiment

Next, a sliding component according to a seventh embodiment of the present invention will be described with reference to FIG. 16. In addition, the description of the configuration that is the same as those of the first to sixth embodiments and is duplicated will be omitted.

Figure 16:
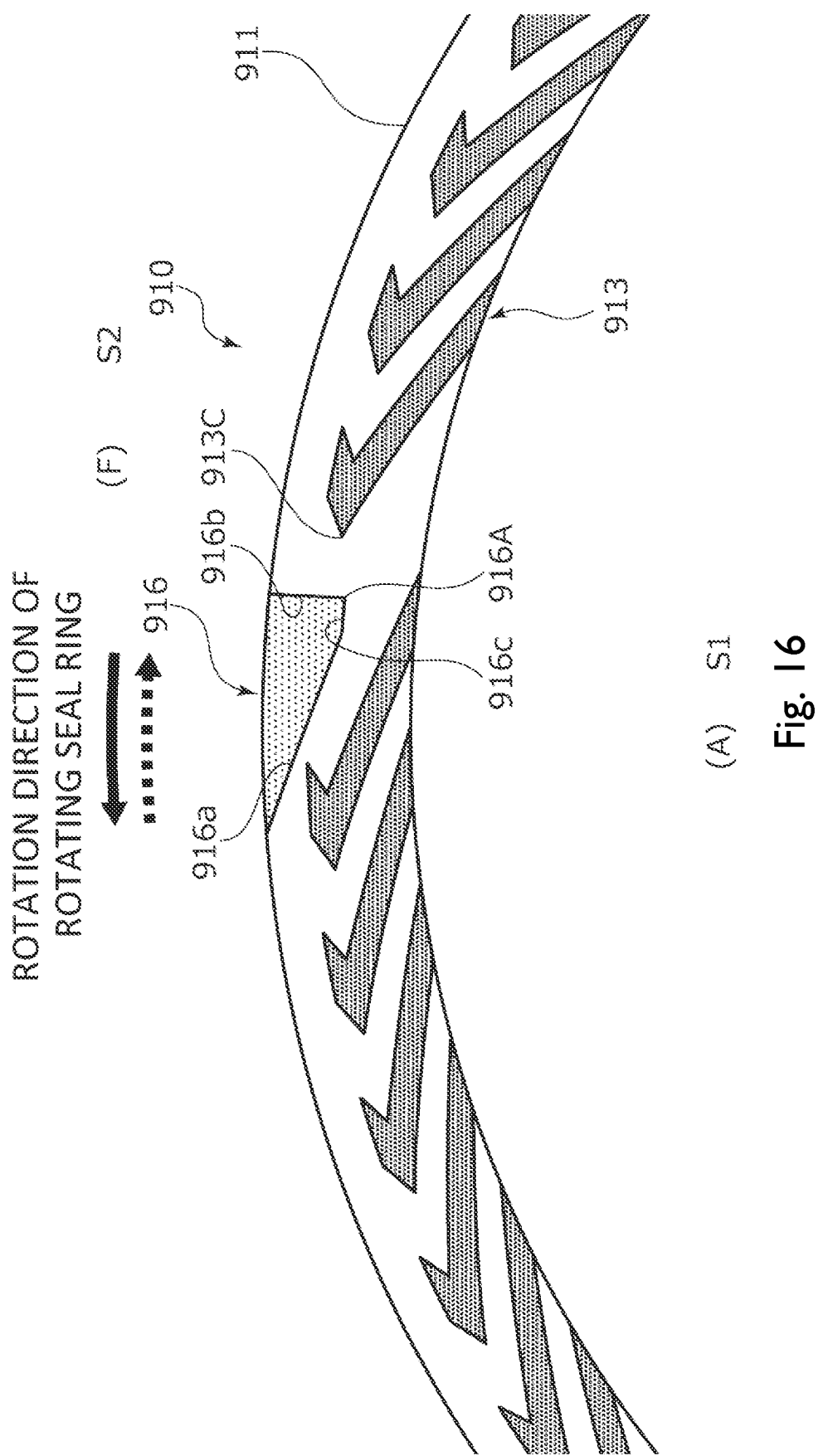
FIG. 16 is an enlarged view of a sliding surface of a stationary seal ring as a sliding component according to a seventh embodiment of the present invention as viewed from the axial direction.

As shown in FIG. 16, a fluid introduction groove 916 of a stationary seal ring 910 of the seventh embodiment is formed as a substantially trapezoidal groove communicating with the outer space S2.

Specifically, in the fluid introduction groove 916, a side wall portion 916a on the downstream side of the rotating seal ring 20 in the normal rotation direction extends in a linear shape while being inclined from the outer radial side toward the inner radial side and the reverse rotation direction and a side wall portion 916b on the upstream side of the rotating seal ring 20 in the normal rotation direction extends in a linear shape along the radial line from the outer radial side toward the inner radial side. Further, in the fluid introduction groove 916, an acute angle portion 916A formed by the wall portion 916c and the side wall portion 916b at the inner radial end is circumferentially disposed close to the acute angle portion 913C of the dynamic pressure generation groove 913 on the downstream side in the reverse rotation direction.

Accordingly, since the side wall portion 916a of the fluid introduction groove 916 is inclined along the circumferential direction, the sealing target fluid F is easily introduced into the fluid introduction groove 916 when the relative rotation between the stationary seal ring 910 and the rotating seal ring 20 during the normal rotation of the rotating seal ring 20 starts.

Further, since the acute angle portion 916A of the fluid introduction groove 916 is circumferentially close to the acute angle portion 913C of the dynamic pressure generation groove 913, the sealing target fluid F intensively leaking to the acute angle portion 916A of the fluid introduction groove 916 during the reverse rotation of the rotating seal ring 20 can be sucked and collected by the negative pressure generated at the acute angle portion 913C of the dynamic pressure generation groove 913 and in the vicinity thereof, it is possible to further suppress the leakage of the sealing target fluid F toward the inner space S1.

Eighth Embodiment

Next, a sliding component according to an eighth embodiment of the present invention will be described with reference to FIG. 17. In addition, the description of the configuration that is the same as those of the first to seventh embodiments and is duplicated will be omitted.

Figure 17:
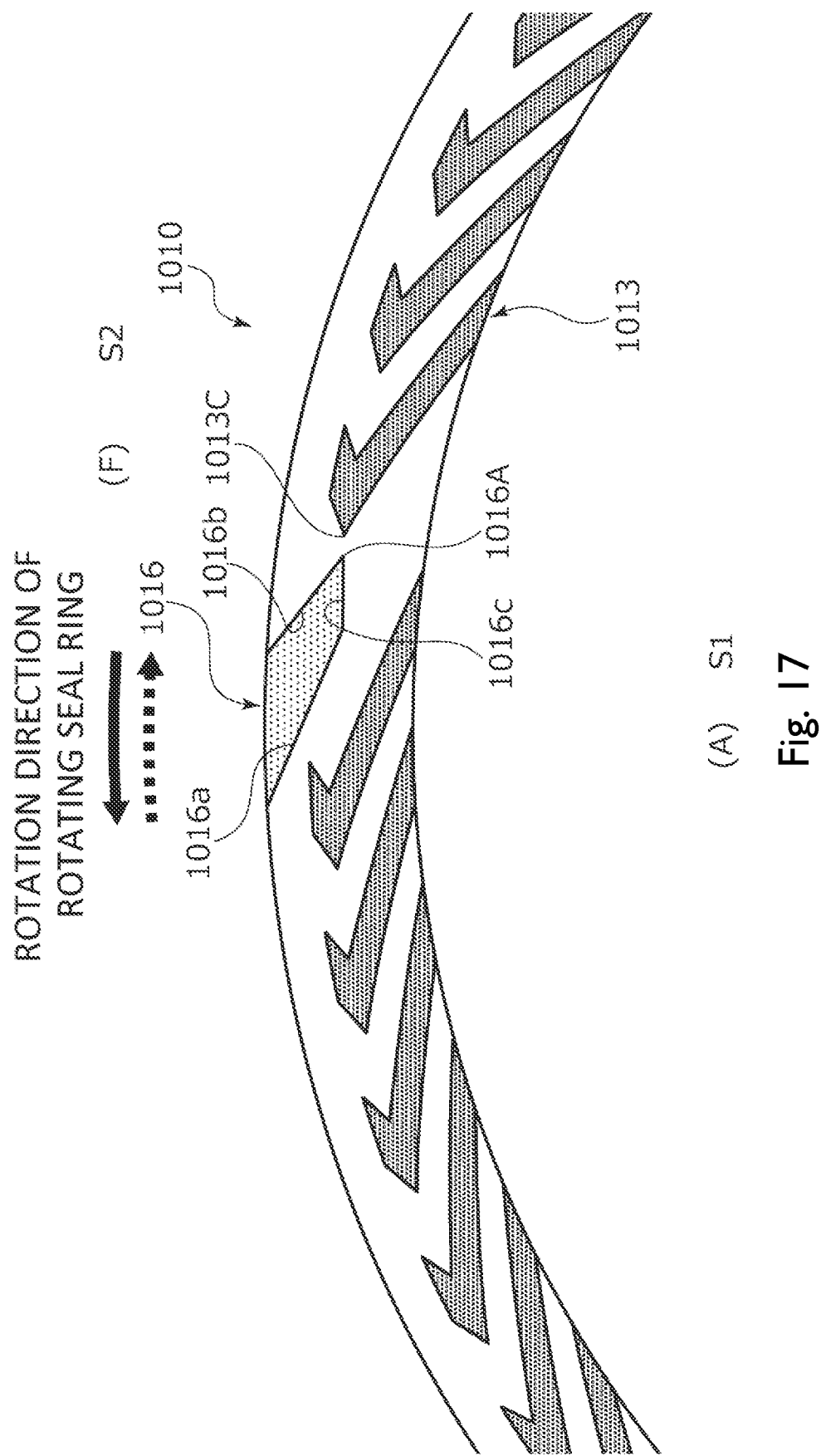
FIG. 17 is an enlarged view of a sliding surface of a stationary seal ring as a sliding component according to an eighth embodiment of the present invention as viewed from the axial direction.

As shown in FIG. 17, a fluid introduction groove 1016 of a stationary seal ring 1010 of the eighth embodiment is formed as a square groove which communicates with the outer space S2.

Specifically, in the fluid introduction groove 1016, a side wall portion 1016a on the downstream side of the rotating seal ring 20 in the normal rotation direction and a side wall portion 1016b on the upstream side thereof in the normal rotation direction extend in a linear shape while being inclined from the outer radial side toward the inner radial side and the reverse rotation direction. Further, in the fluid introduction groove 1016, an acute angle portion 1016A which is formed by the wall portion 1016c and the side wall portion 1016b at the inner radial end is disposed circumferentially close to an acute angle portion 1013C of the dynamic pressure generation groove 1013 on the downstream side in the reverse rotation direction.

Accordingly, since side wall portions 1016a and 1016b of the fluid introduction groove 1016 are respectively inclined along the circumferential direction, the sealing target fluid F is more easily introduced into the fluid introduction groove 1016 when the relative rotation between the stationary seal ring 1010 and the rotating seal ring 20 during the normal rotation of the rotating seal ring 20 starts.

Further, since the acute angle portion 1016A of the fluid introduction groove 1016 has a small angle and is circumferentially closer to the acute angle portion 1013C of the dynamic pressure generation groove 1013 compared to the seventh embodiment, the sealing target fluid F easily concentrates on the acute angle portion 1016A and the sealing target fluid F intensively leaking to the acute angle portion 1016A of the fluid introduction groove 1016 can be sucked and collected by the negative pressure generated at the acute angle portion 1013C of the dynamic pressure generation groove 1013 and in the vicinity thereof during the reverse rotation of the rotating seal ring 20. Accordingly, it is possible to further suppress the leakage of the sealing target fluid F toward the inner space S1.

Ninth Embodiment

Next, a sliding component according to a ninth embodiment of the present invention will be described with reference to FIG. 18. In addition, the description of the configuration that is the same as those of the first to eighth embodiments and is duplicated will be omitted.

Figure 18:
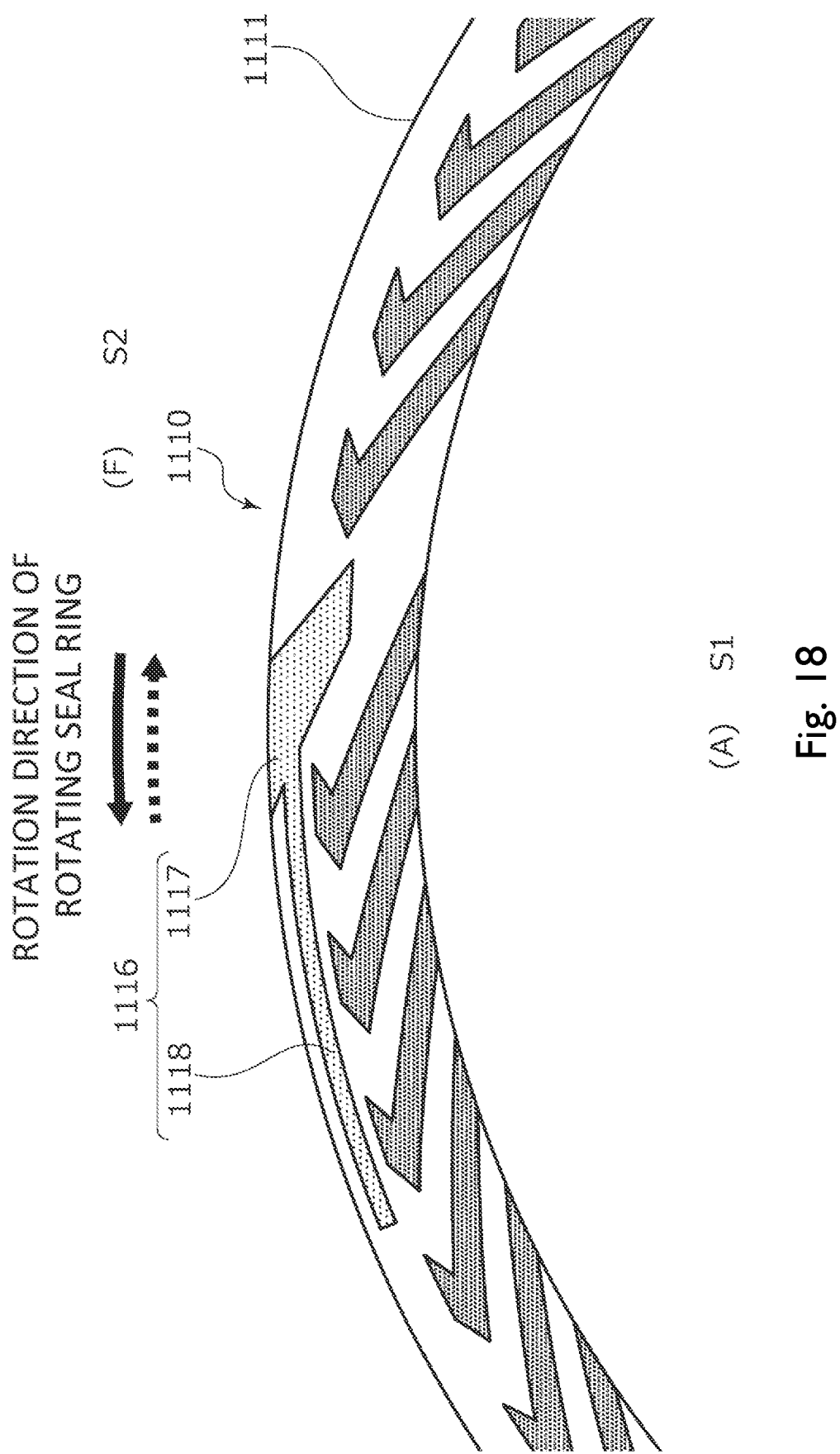
FIG. 18 is an enlarged view of a sliding surface of a stationary seal ring as a sliding component according to a ninth embodiment of the present invention as viewed from the axial direction.

As shown in FIG. 18, a fluid introduction groove 1116 of a stationary seal ring 1110 of the ninth embodiment includes a liquid guide groove portion 1117 which communicates with the outer space S2 and a Rayleigh step 1118 which is a dynamic pressure generation portion extending in the circumferential direction concentrically with the stationary seal ring 1110 from the outer radial side of the liquid guide groove portion 1117 toward the normal rotation direction of the rotating seal ring 20. In addition, the liquid guide groove portion 1117 has substantially the same shape as the fluid introduction groove 1016 of the eighth embodiment.

Accordingly, since the fluid introduction groove 1116 includes the Rayleigh step 1118 which is the dynamic pressure generation portion, a dynamic pressure is generated by the Rayleigh step 1118 during the normal rotation so that the sliding surfaces 1111 and 21 are slightly separated from each other and the sealing target fluid F is supplied between the sliding surfaces 1111 and 21, it is possible to improve the lubricity between the sliding surfaces 1111 and 21.

Tenth Embodiment

Next, a sliding component according to a tenth embodiment of the present invention will be described with reference to FIG. 19. In addition, the description of the configuration that is the same as those of the first to ninth embodiments and is duplicated will be omitted.

Figure 19:
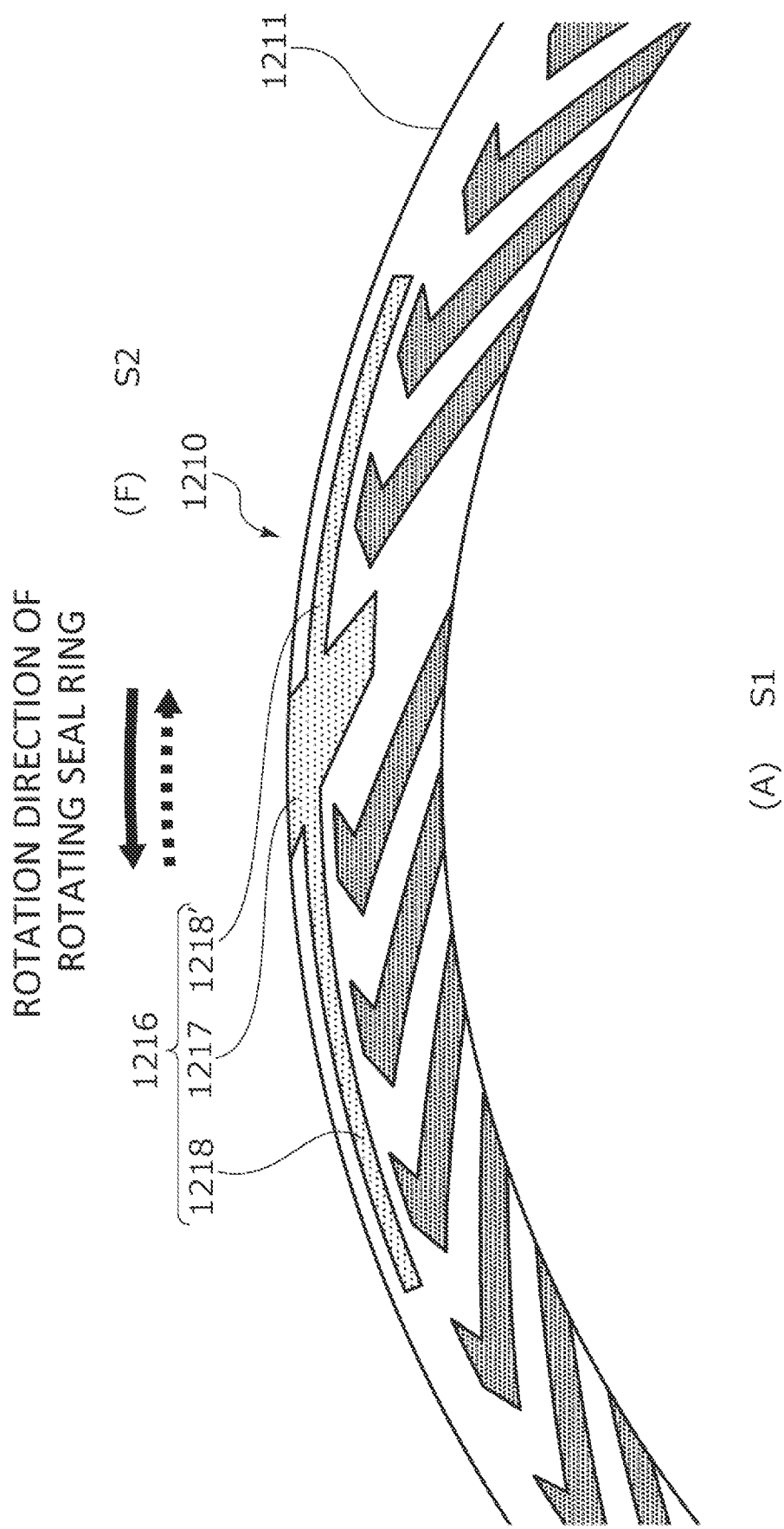
FIG. 19 is an enlarged view of a sliding surface of a stationary seal ring as a sliding component according to a tenth embodiment of the present invention as viewed from the axial direction.

As shown in FIG. 19, a fluid introduction groove 1216 of a stationary seal ring 1210 of the tenth embodiment includes a liquid guide groove portion 1217 which communicates with the outer space S2 and Rayleigh steps 1218 and 1218' which are dynamic pressure generation portions respectively extending in the circumferential direction concentrically with the stationary seal ring 1210 from the inner radial side of the liquid guide groove portion 1217 toward the normal rotation direction and the reverse rotation direction of the rotating seal ring 20. In addition, the liquid guide groove portion 1217 has substantially the same shape as the fluid introduction groove 1016 of the eighth embodiment.

Accordingly, since the Rayleigh steps 1218 and 1218' generate the dynamic pressure during both rotations so that the sliding surfaces 1211 and 21 are slightly separated from each other and the sealing target fluid F is supplied between the sliding surfaces 1211 and 21, it is possible to improve the lubricity between the sliding surfaces 1211 and 21.

Although the embodiments of the present invention have been described with reference to the drawings, the specific configuration is not limited to these embodiments and is included in the present invention even if there are changes or additions within the scope of the present invention.

For example, in the above-described embodiments, as the sliding component, the mechanical seal for automobiles has been described as an example, but other mechanical seals for general industrial machines may be used. Further, the present invention is not limited to the mechanical seal and may be a sliding component other than the mechanical seal such as a slide bearing.

Further, in the above-described embodiments, an example in which the dynamic pressure generation groove and the fluid introduction groove are provided in the stationary seal ring has been described, but the dynamic pressure generation groove and the fluid introduction groove may be provided in the rotating seal ring.

Further, the sealing target fluid side has been described as the high-pressure side and the leakage side has been described as the low-pressure side. However, the sealing target fluid side may be the low-pressure side, the leakage side may be the high-pressure side, and the sealing target fluid side and the leakage side may have substantially the same pressure.

Further, it has been described that the inclined groove in the dynamic pressure generation groove communicates with the inner space S1, but the present invention is not limited thereto. If the dynamic pressure can be generated, the inclined groove may not communicate with the inner space.

Further, the dynamic pressure generation groove is not limited to the one in which the reverse inclined groove is continuously formed at the outer radial end portion of the inclined groove and the reverse inclined groove may be formed by branching from substantially the center portion of the inclined groove in the extension direction.

Further, in the dynamic pressure generation groove, the plurality of reverse inclined grooves may be arranged for one inclined groove.

Further, the inclined groove is not limited to the one extending in the circular shape while being inclined in the circumferential direction and the shape may be simplified by the linear shape.

Further, it has been described that the dynamic pressure generation groove and the fluid introduction groove have substantially the same depth, but the fluid introduction groove may be deeper than the dynamic pressure generation groove.

Further, in this embodiment, the sealing target fluid F has been described as the high-pressure liquid, but the present invention is not limited thereto. For example, the sealing target fluid may be a gas or a low-pressure liquid or may be a mist in which a liquid and a gas are mixed.

Further, in this embodiment, the leakage side fluid has been described as the atmosphere A corresponding to the low-pressure gas, but the present invention is not limited thereto. For example, the leakage side fluid may be a liquid or a high-pressure gas or may be a mist in which a liquid and a gas are mixed.

REFERENCE SIGNS LIST

10 Stationary seal ring (sliding component)
11 Sliding surface
12 Land
12a to 12c Land portion
13 Dynamic pressure generation groove
13C, 13D Acute angle portion
14 Inclined groove 15 Reverse inclined groove
16 Fluid introduction groove
17 Liquid guide groove portion
18 Rayleigh step (dynamic pressure generation portion)
20 Rotating seal ring (different component)
21 Sliding surface
410 Stationary seal ring (sliding component)
411 Sliding surface
412d Annular land portion
413 Dynamic pressure generation groove
414 Inclined groove
414C Acute angle portion
415 Reverse inclined groove
415C, 415D Acute angle portion
A Atmosphere
F Sealing target fluid
S1 Inner space
S2 Outer space

The invention claimed is:

1. A sliding component formed in an annular shape, the sliding component for being disposed at a relatively rotating position of a rotating machine and for sliding relative to a different sliding component, and comprising a sliding surface provided with a plurality of fluid introduction grooves communicating with a space on a sealing target fluid side and for introducing a sealing target fluid thereinto and a plurality of inclined grooves extending from a leakage side toward the sealing target fluid side and being for generating a dynamic pressure, wherein the sliding surface of the sliding component is provided with a reverse inclined groove which is provided on the sealing target fluid side of the inclined groove, extends in a reverse direction with respect to the inclined groove, for generating a dynamic pressure, the reverse inclined groove is for directly communicating with one end of one of the inclined grooves on the sealing target fluid side or not for communicating with each of the inclined grooves, the reverse inclined groove does not communicate with the space on the sealing target fluid side, and the reverse inclined groove has an extension length shorter than extension lengths of the inclined grooves.

2. The sliding component according to claim 1, wherein each of the inclined grooves is for communicating with a space on the leakage side.

3. The sliding component according to claim 1, wherein an annular land portion which is continuous in a circumferential direction on the sealing target fluid side of the inclined groove is provided between the inclined grooves and the reverse inclined groove, and a radial center of the annular land portion is disposed closer to the sealing target fluid side in relation to a radial center of the sliding surface.

4. The sliding component according to claim 1, wherein the reverse inclined groove is a groove of which an end portion on the sealing target fluid side is tapered.

5. The sliding component according to claim 1, wherein each of the fluid introduction grooves includes a dynamic pressure generation portion.

6. The sliding component according to claim 2, wherein the reverse inclined groove is a groove of which an end portion on the sealing target fluid side is tapered.

7. The sliding component according to claim 2, wherein each of the fluid introduction grooves includes a dynamic pressure generation portion.

* * * * *